United States Patent
Shigematsu et al.

(10) Patent No.: US 8,400,894 B2
(45) Date of Patent: Mar. 19, 2013

(54) METHOD FOR WRITING DATA ON MULTILAYER OPTICAL DISC AND OPTICAL DISC DRIVE

(75) Inventors: Hiroaki Shigematsu, Osaka (JP); Harumitsu Miyashita, Osaka (JP); Yoshiyasu Nakayama, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/132,159

(22) PCT Filed: Sep. 14, 2010

(86) PCT No.: PCT/JP2010/005607
§ 371 (c)(1),
(2), (4) Date: Jun. 1, 2011

(87) PCT Pub. No.: WO2012/025973
PCT Pub. Date: Mar. 1, 2012

(65) Prior Publication Data
US 2012/0051198 A1   Mar. 1, 2012

(30) Foreign Application Priority Data
Aug. 25, 2010 (JP) ................................. 2010-188309

(51) Int. Cl.
*G11B 15/52* (2006.01)
(52) U.S. Cl. ............ 369/47.51; 369/53.27; 369/94
(58) Field of Classification Search .............. None
See application file for complete search history.

(56) References Cited

U.S. PATENT DOCUMENTS
5,841,747 A   11/1998 Kubota et al.
7,339,865 B2 *  3/2008 Lee et al. ............... 369/47.53
(Continued)

FOREIGN PATENT DOCUMENTS
JP    2000-090465 A    3/2000
JP    2003-248929 A    9/2003
(Continued)

OTHER PUBLICATIONS

International Search Report for corresponding International Application No. PCT/JP2010/005607 mailed Nov. 30, 2010.
(Continued)

*Primary Examiner* — Paul Huber
(74) *Attorney, Agent, or Firm* — Renner, Otto, Boisselle & Sklar, LLP

(57) ABSTRACT

The present invention provides a method for writing data on a multilayer optical disc with N information storage layers (where N is an integer and $N \geq 2$). The $k^{th}$ deepest one (where k is an integer and $1 \leq k \leq N$) of the storage layers of the multilayer optical disc is called a $k^{th}$ information storage layer. The method includes the steps of: (A) finding the number of layers that an optical disc loaded into an optical disc drive has (disc type recognition); if the number of layers is X (which is an integer and $X \geq 2$), (B) tentatively writing data on a test write area of an $m^{th}$ information storage layer (where m is an integer and $1 \leq m \leq X-1$), thereby determining a provisional initial optical recording power (performing OPC); (C) choosing an appropriate correction coefficient according to the level of a target layer, on which data needs to be written, and correcting the provisional initial optical recording power based on the correction coefficient chosen, thereby determining an initial optical recording power; and (D) starting writing the data on the target layer with the initial optical recording power.

11 Claims, 17 Drawing Sheets

U.S. PATENT DOCUMENTS

| | | | |
|---|---|---|---|
| 7,525,888 B2 * | 4/2009 | Ninomiya | 369/47.53 |
| 7,693,016 B2 * | 4/2010 | Miyazawa et al. | 369/47.53 |
| 2003/0161237 A1 | 8/2003 | Ogawa | |
| 2004/0085874 A1 | 5/2004 | Akiyama et al. | |
| 2005/0117481 A1 | 6/2005 | Akiyama et al. | |
| 2006/0126463 A1 | 6/2006 | Nakao et al. | |
| 2007/0064560 A1 | 3/2007 | Muramatsu et al. | |
| 2008/0101209 A1 | 5/2008 | Nagai et al. | |
| 2009/0016184 A1 | 1/2009 | Kikukawa et al. | |
| 2009/0129224 A1 | 5/2009 | Kameda et al. | |

FOREIGN PATENT DOCUMENTS

| | | |
|---|---|---|
| JP | 2004-171740 A | 6/2004 |
| JP | 2005-100558 A | 4/2005 |
| JP | 2006-164443 A | 6/2006 |
| JP | 2006-179162 A | 7/2006 |
| JP | 2007-066491 A | 3/2007 |
| JP | 2007-265507 A | 10/2007 |
| JP | 2008-097725 A | 4/2008 |
| JP | 2008-108388 A | 5/2008 |
| JP | 2008-192258 A | 8/2008 |
| JP | 2009-104704 A | 5/2009 |
| WO | 2009/011106 A1 | 1/2009 |

OTHER PUBLICATIONS

Form PCT/ISA/237 and Partial English translation for International Application No. PCT/JP2010/005607 mailed Nov. 30, 2010.

* cited by examiner (a)

| DISC MANUFACTURER | DISC | LAYER | INITIAL POWER CORRECTION COEFFICIENT(PWmid/PWb) |
|---|---|---|---|
| COMPANY A | TRIPLE-LAYER BD-R | L0 | 1.30 |
| | | L1 | 1.15 |
| | | L2 | 1.00 |
| COMPANY B | QUADRUPLE-LAYER BD-R | L0 | 1.45 |
| | | L1 | 1.30 |
| | | L2 | 1.15 |
| | | L3 | 1.00 |
| COMPANY C | TRIPLE-LAYER BD-R | L0 | 0.80 |
| | | L1 | 0.90 |
| | | L2 | 1.00 |
| . | . | . | . |
| . | . | . | . |
| . | . | . | . |

METHOD FOR WRITING DATA ON MULTILAYER OPTICAL DISC AND OPTICAL DISC DRIVE

This application is a 371 of PCT/JP2010/005607, filed Sep. 14, 2010.

TECHNICAL FIELD

The present invention relates to a method for writing data on a multilayer optical disc with multiple information storage layers and also relates to an optical disc drive that performs such a data writing method.

BACKGROUND ART

In optical disc technologies, data can be read out from a rotating optical disc by irradiating the disc with a relatively weak light beam with a constant intensity and detecting the light that has been modulated by, and reflected from, the optical disc. On a read-only optical disc, information is already stored as pits that are arranged spirally during the manufacturing process of the optical disc. On the other hand, on a rewritable optical disc, a recording material film, from/on which data can be read and written optically, is deposited by evaporation process, for example, on the surface of a substrate on which spiral lands or grooves are arranged. In writing data on a rewritable optical disc, data is written there by irradiating the optical disc with a light beam, of which the optical power has been changed according to the data to be written, and locally changing the property of the recording material film.

It should be noted that the depth of the pits and tracks and the thickness of the recording material film are both smaller than the thickness of the optical disc substrate. For that reason, those portions of the optical disc, where data is stored, define a two-dimensional plane, which is sometimes called a "storage plane" or an "information plane". However, considering that such a plane actually has a physical dimension in the depth direction, too, the term "storage plane (or information plane)" will be replaced herein by another term "information storage layer". Every optical disc has at least one such information storage layer. Optionally, a single information storage layer may actually include a plurality of layers such as a phase-change material layer and a reflective layer.

In a recordable or rewritable optical disc, when data is going to be written on its information storage layer, the information storage layer is irradiated with such a light beam, of which the optical power has been modulated as described above, thereby recording an amorphous mark on a crystalline phase change material layer. Such an amorphous mark is recorded there by heating a portion of the information storage layer that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point but the recorded mark will turn crystalline again after having been cooled rapidly (i.e., the recorded mark will be erased). In this manner, the recorded mark can be rewritten over and over again. However, if the optical power of the light beam for writing data (i.e., optical recording power) had an inappropriate level, then the recorded mark would have a deformed shape and sometimes it could be difficult to read the data as intended.

Such an amorphous recorded mark has a different reflectance from its surrounding crystalline portions. For that reason, when a read operation is performed, the intensity of the reflected light varies depending on whether or not a recorded mark is there. In an area where data has already been written (which will be referred to herein as a "recorded area"), there is a series of recorded marks and spaces, of which the lengths are variable with the contents of the data to be written. For that reason, the optical properties (i.e., the optical reflectance and transmittance) of such a recorded area are different from those of an area where no data has been written yet (which will be referred to herein as an "unrecorded area").

To read data that is stored on an optical disc or to write data on a rewritable optical disc, the light beam always needs to maintain a predetermined converging state on a target track on an information storage layer. For that purpose, a "focus control" and a "tracking control" need to be done. The "focus control" means controlling the position of an objective lens along a normal to the surface of the information plane (such a direction will sometimes be referred to herein as "substrate depth direction") so that the focal point (or at least the converging point) of the light beam is always located on the information storage layer. On the other hand, the "tracking control" means controlling the position of the objective lens along the radius of a given optical disc (which direction will be referred to herein as a "disc radial direction") so that the light beam spot is always located right on a target track.

In order to perform such a focus control or a tracking control, the focus error or the tracking error needs to be detected based on the light that has been reflected from the optical disc and the position of the light beam spot needs to be adjusted so as to reduce the error as much as possible. The magnitudes of the focus error and the tracking error are represented by a "focus error (FE) signal" and a "tracking error (TE) signal", both of which are generated based on the light that has been reflected from the optical disc.

Dual-layer optical discs, in which two information storage layers are stacked one upon the other, have already been put on the market recently. And now, so-called "multilayer optical discs", including a stack of three or more information storage layers, are also being developed. In the following description, however, an optical disc in which N layers (where N is an integer that is equal to or greater than two) are stacked one upon the other (i.e., any optical disc with at least two layers) will be referred to herein as a "multilayer optical disc".

When data is being read from, or written on, a target one of the information storage layers of a multilayer optical disc, the optical disc drive needs to set the focus position of the light beam on the target information storage layer and form a tiny light beam spot on that information storage layer. As a single multilayer optical disc has multiple information storage layers, if the focus position of a light beam is set on the deepest information storage layer, for example, that light beam should pass all of the other information storage layers that are shallower than the deepest layer.

Unless the intensity of a light beam (i.e., the optical recording power) is optimized when data is going to be written, a recorded mark will be deformed as described above, and therefore, the read error rate will rise. Thus, in order to optimize the optical recording power, data are sometimes tentatively written on a test write area of an information storage layer of an optical disc with the optical recording power changed into multiple different values and the data thus written are read. In this manner, a read error index may be set on the test write area and an optical recording power associated with the best index may be selected. Strictly speaking, however, the optical recording power optimized in this manner is nothing but "initial optical recording power". That is to say, after data has started to be written on a user data area with the initial optical recording power thus determined, the initial optical recording power will be corrected as needed into a more appropriate level based on a β value to be described later, for example. Such processing to be performed by an optical disc drive on the test write area in order to determine the initial optical recording power will be referred to herein as "optimum power control (OPC)".

FIG. 1(a) illustrates a multilayer optical disc 10 and FIG. 1(b) is a schematic cross-sectional view thereof. The multilayer optical disc 10 shown in FIG. 1 includes a first information storage layer L0, which is located deepest under the disc surface 10a on which a light beam is incident, and a second information storage layer L1, which is located closest to the disc surface 10a. The multilayer optical disc 10 has a user data area on which user data will be written and a test write area, which will also be referred to herein as a "power calibration area (PCA)" and which is located inside of the user data area. Although the multilayer optical disc 10 actually has other management areas in addition to the PCA, those areas are not shown in FIG. 1 for the sake of simplicity.

FIG. 2 illustrates in further detail a portion of the cross section of the multilayer optical disc 10 shown in FIG. 1(b). In FIG. 2, illustrated schematically are three light beams that are respectively focused on three different areas a, b and c on the information storage layer L0. Specifically, the area a is a part of the PCA on which no data has been written yet on any of the two information storage layers L0 and L1 (i.e., an unrecorded area). Likewise, the area b is a part of the user data area on which no data has been written yet on any of the two information storage layers L0 and L1 (i.e., an unrecorded area). Meanwhile, the area c is a part of the user data area on which data has been written on the information storage layer L1 (i.e., a recorded area).

Portions of the information storage layer L1 on which data has been written have a different optical transmittance from the rest of the same layer L1 on which no data has been written yet. In the majority of optical discs, a recorded area has a lower optical transmittance than an unrecorded area. Thus, the light beam focused on the area c of the information storage layer L0 has been transmitted through a portion of the information storage layer L1 that has a decreased optical transmittance. As a result, the intensity of the light beam on the information storage layer L0 is lower in the area c than in the area b.

In this manner, the quantity of light that the light beam focused on the information storage layer L0 can give to that information storage layer L0 changes depending on whether or not data has been written on the information storage layer L1 that is located shallower (i.e., closer to the disc surface) than the information storage layer L0.

FIG. 3 is a graph showing how the rate of errors caused by reading data from the information storage layer L0 changes with the optical recording power. In FIG. 3, the abscissa represents the optical recording power (which will be sometimes simply referred to herein as "power") and the ordinate represents the error rate during reading (which is the error rate of the L0 layer). Specifically, one curve shown in FIG. 3 indicates results that are obtained in the areas a and b, which are unrecorded areas, and the other curve shown in FIG. 3 indicates results that are obtained in the area c, which is a recorded area.

As can be seen from FIG. 3, in the areas a and b, the error rate is the lowest when the optical recording power is PWb. In other words, it can be seen that the optical recording power is preferably set to be PWb in the unrecorded areas a and b. In the area c, on the other hand, the error rate is the lowest when the optical recording power is PWc. That is to say, it can be seen that the optical recording power is preferably set to be PWc, which is greater than PWb, in the recorded area c. Consequently, it is preferred that data be written on the recorded area c with higher optical recording power than on the unrecorded areas a and b.

According to currently available techniques, when data is going to be written on a target location with a particular address in the user data area of a given optical disc, it is not clear whether that location falls within a recorded area or an unrecorded area. That is why the initial optical recording power to start writing data with is set to be the best value for the unrecorded area (e.g., PWb in the example illustrated in FIG. 3). In that case, after data has started to be written on the user data area, the optical recording power is corrected at short intervals by reference to an index indicating a read signal waveform while reading the data.

FIG. 4(a) illustrates a cross section of the multilayer optical disc 10 just like FIG. 2. FIGS. 4(b) and 4(c) show how the optical recording power needs to be, or need not be, corrected with time in two different situations where data has started to be written on the area b, which is an unrecorded area, and on the area c, which is a recorded area, with the initial optical recording power PWb in both cases.

In the example illustrated in FIG. 4(b), the optical recording power is maintained at PWb, which is the optimum value for the area b. On the other hand, in the example illustrated in FIG. 4(c), the optical recording power is corrected so as to increase toward the optimum value PWc for the area c.

The greater the number of information storage layers included in a multilayer optical disc, the more and more often there are two or more information storage layers that are located shallower than the deepest information storage layer L0 when a light beam is focused on that layer L0. For that reason, in the recorded areas on those shallower information storage layers, the optical transmittance will decrease more and more significantly.

FIG. 5(a) schematically illustrates a cross section of a multilayer optical disc with three information storage layers L0, L1 and L2. FIGS. 5(b) and 5(c) show how the optical recording power needs to be, or need not be, corrected with time in two different situations where data has started to be written on the area b, which is an unrecorded area, and on the area e, which is a recorded area, with the initial optical recording power PWb in both cases.

In the example illustrated in FIG. 5(c), the optical recording power is corrected so as to increase toward the optimum value PWe for the area e. However, it might take a longer time for the optical recording power to reach that optimum value PWe than in FIG. 4(c). The reason is that as data has already been written in the area e on both of the information storage layers L1 and L2, the optical transmittance would decrease significantly in that area and the optimum optical recording power value PWe for the area e could be quite different from the optimum optical recording power PWb for the areas a and b.

The number of information storage layers included in a multilayer optical disc should continue to increase from now on. And most multilayer optical discs could have four or more information storage layers in the near future. Even so, the same problem should arise in those multilayer optical discs. That is to say, if data started to be written with the optical recording power PWb that has been optimized for an unrecorded area a, the optical recording power could not be corrected into a more appropriate value in a reasonably short time. Thus, to overcome such a problem, Patent Document No. 1 discloses a technique for performing an OPC on the PCA for every possible combination of recorded and unrecorded areas.

Besides adopting the technique disclosed in Patent Document No. 1, Patent Document No. 2 also teaches managing the addresses of the recorded and unrecorded areas so as to determine whether the target location falls within a recorded area or an unrecorded area and then changing the initial optical recording power based on a result of that decision.

CITATION LIST

Patent Literature

Patent Document No. 1: Japanese Patent Application Laid-Open Publication No. 2008-108388
Patent Document No. 2: Japanese Patent Application Laid-Open Publication No. 2008-192258

SUMMARY OF INVENTION

Technical Problem

According to the technique disclosed in Patent Document No. 1, however, a non-negligible part of the PCA should be spent on test writing, and it takes a much longer time to get that test writing done, too. And the greater the number of layers included in an optical disc, the more and more exponentially that space or time to spend should be increased.

On the other hand, according to the technique disclosed in Patent Document No. 2, the recorded and unrecorded areas of each information storage layer are managed on an address basis. That is why if two information storage layers to be stacked vertically one upon the other were misaligned with each other during the bonding process, then those recorded and unrecorded areas could not be located accurately by the addresses. For example, suppose data needs to be written at a particular location, which has been specified by an address, on the information storage layer L0. In that case, even if a corresponding area of the shallower information storage layer L1 is located by the address and if it is determined whether or not data has been written on that area, that address-based association could be inaccurate due to physical misalignment between the two information storage layers L0 and L1.

As can be seen, the techniques disclosed in Patent Documents Nos. 1 and 2 are not free from a problem or two and cannot be called practical. However, contrary to Patent Documents Nos. 1 and 2, the present inventors do believe that the write performance does not always have to be optimized but just needs to be corrected to fall within a permissible range. Specifically, for that purpose, a first initial value is set according to the present invention for a preferred optical recording power for writing data on a multilayer optical disc in which data has not been written yet on any other information storage layer thereof. A second initial value is also set for a preferred optical recording power for writing data on a multilayer optical disc in which data has already been written on each of other information storage layers thereof. The initial recording power is determined somewhere between the first and second optimum values. And after an initial write operation has been performed with the initial optical recording power, the optical recording power is changed dynamically according to the read performance required. By adopting such an idea, there is no need to increase the space to spend in the PCA according to the number of layers included in an optical disc, and a write performance falling within a permissible range can always be ensured, no matter whether a corresponding area on another layer is a recorded area or an unrecorded area.

It is therefore an object of the present invention to provide a data writing method, by which when data is going to be written on a user data area, the recording power can be quickly corrected into the most appropriate one, no matter whether a corresponding location in another information storage layer, which agrees in plan view with the storage location of the data on a target information storage layer but which is located at a shallower level in the thickness direction than the storage location, falls within a recorded area or in an unrecorded area. Another object of the present invention is to provide an optical disc drive that carries out such a data writing method.

Solution to Problem

A data writing method according to the present invention is a method for writing data on a multilayer optical disc that has N information storage layers (where N is an integer that is equal to or greater than two). If the $k^{th}$ deepest one (where k is an integer that satisfies $1 \leq k \leq N$) of the information storage layers of the multilayer optical disc is called a $k^{th}$ information storage layer, the method includes the steps of: (A) finding the number of information storage layers that an optical disc that has been loaded into an optical disc drive has; if the number of layers is X (which is an integer that is equal to or greater than two), (B) tentatively writing data on a test write area of an $m^{th}$ information storage layer (where m is an integer that satisfies $1 \leq m \leq X-1$), which needs to be subjected to a test write operation, thereby determining a provisional initial optical recording power; (C) choosing an appropriate correction coefficient according to the level of a target information storage layer, on which data is going to be written, and correcting the provisional initial optical recording power based on the correction coefficient chosen, thereby determining an initial optical recording power; and (D) starting writing the data on the target information storage layer with the initial optical recording power.

In one preferred embodiment, the step (B) includes, if the number of layers is X (which is an integer that is equal to or greater than two), tentatively writing data on an unrecorded area of a test write area of the $m^{th}$ information storage layer (where m is an integer that satisfies $1 \leq m \leq X-1$), which needs to be subjected to the test write operation, thereby determining the provisional initial optical recording power. The unrecorded area corresponds to a portion of each of the $(m+1)^{th}$ through $X^{th}$ information storage layers on which no data has been written yet.

In another preferred embodiment, the step (C) includes choosing the appropriate correction coefficient according to not only the level of the target information storage layer but also the type of the optical disc loaded as well.

In this particular preferred embodiment, the method includes the step of storing correction coefficient information in a memory of the optical disc drive with respect to each of the multiple information storage layers of every type of multilayer optical disc that is compatible with the optical disc drive. The correction coefficient information provides a specific value of the correction coefficient for each type of multilayer optical disc.

In yet another preferred embodiment, if the multilayer optical disc loaded is an optical transmittance decreasing type, the initial optical recording power determined in the step (C) is greater than the provisional initial optical recording power.

In yet another preferred embodiment, the method further includes the step of changing the initial optical recording power as needed based on the waveform of a signal that has been obtained from the optical disc after data has started to be written in the step (D).

In yet another preferred embodiment, the method further includes the step of correcting the optical recording power so that a β value, indicating the degree of symmetry of the amplitude of a read signal obtained from the optical disc with respect to the average of the signal, becomes as close to a target β value as possible after data has started to be written in the step (D).

In a specific preferred embodiment, m=1.

An optical disc drive according to the present invention is designed to write data on a multilayer optical disc that has N information storage layers (where N is an integer that is equal to or greater than two). The drive includes: an optical pickup for optically accessing the multilayer optical disc; a memory that stores correction coefficient information with respect to each of the multiple information storage layers of every type of multilayer optical disc that is compatible with the optical disc drive, wherein the correction coefficient information provides a specific value of the correction coefficient for each type of multilayer optical disc; and a write processing section for determining a provisional initial optical recording power by tentatively writing data on a test write area of one of the information storage layers of the multilayer optical disc loaded, choosing an appropriate correction coefficient from the memory according to the level of a target information storage layer, on which data is going to be written, and then correcting the provisional initial optical recording power based on the correction coefficient chosen, thereby determining an initial optical recording power.

Advantageous Effects of Invention

The present invention provides a data writing method, by which when data is going to be written on a user data area, the recording power can be quickly corrected into the most appropriate one, no matter whether a corresponding location in another information storage layer, which agrees in plan view with the storage location of the data on a target information storage layer but which is located at a shallower level in the thickness direction than the storage location, falls within a recorded area or in an unrecorded area.

BRIEF DESCRIPTION OF DRAWINGS

In FIG. 3, the abscissa represents the optical recording power (which will be sometimes simply referred to herein as "power") and the ordinate represents the error rate during reading (which is the error rate of the L0 layer).

FIGS. 4(*b*) and 4(*c*) show how the optical recording power needs to be, or need not be, corrected with time in two different situations where data has started to be written on the area b of the information storage layer L0, which is associated with an unrecorded area of the information storage layer L1, and on the area c of the information storage layer L0, which is associated with a recorded area of the information storage layer L1, with the initial optical recording power PWb in both cases.

FIGS. 5(*b*) and 5(*c*) show how the optical recording power needs to be, or need not be, corrected with time in two different situations where data has started to be written on the area b of the information storage layer L0, which is associated with respective unrecorded areas of the information storage layers L1 and L2, and on the area e of the information storage layer L0, which is associated with recorded areas of the information storage layers L1 and L2, with the initial optical recording power Pwb in both cases. And FIGS. 5(*d*) and 5(*e*) show how the optical recording power needs to be, or need not be, corrected with time in two different situations where data has started to be written on the area b of the information storage layer L0, which is associated with respective unrecorded areas of the information storage layers L1 and L2, and on the area e of the information storage layer L0, which is associated with recorded areas of the information storage layers L1 and L2, with the initial optical recording power PWmid in both cases.

FIG. 6(*b*) is a graph showing how the error rate changes with the optical recording power when the data that has been written on the information storage layer L0 is read from a triple-layer optical disc.

FIG. 7(*b*) is a graph showing how the error rate changes with the optical recording power when the data that has been written on the information storage layer L0 is read from such a triple-layer optical disc.

FIG. 8(*b*) is a graph showing how the error rate changes with the optical recording power when the data that has been written on the information storage layer L0 is read from such a quadruple-layer optical disc.

FIG. 9 is a table showing examples of correction coefficients.

DESCRIPTION OF EMBODIMENTS

A data writing method according to the present invention is a method for writing data on a multilayer optical disc that has N information storage layers (where N is an integer that is equal to or greater than two). The $k^{th}$ deepest one (where k is an integer that satisfies $1 \leq k \leq N$) of the information storage layers of the multilayer optical disc will be referred to herein as a $k^{th}$ information storage layer. In the triple-layer optical disc shown in FIG. 5(a), the information storage layer L0 is the "first information storage layer" and the information storage layer L1 is the "second information storage layer". The total number of layers that the multilayer optical disc has is supposed to be X (which is an integer that is equal to or greater than two). If a portion of the test write area of the $m^{th}$ information storage layer (where m is an integer that satisfies $1 \leq m \leq X-1$) that needs to be subjected to a test write operation corresponds to unrecorded portion (where no data has been written yet) in each of the $(m+1)^{th}$ through $X^{th}$ information storage layers, then the former portion will be referred to herein as an "unrecorded area". In the example to be described below, the information storage layer that is subjected to a test write operation for the purpose of OPC is supposed to be the first information storage layer that is the deepest layer. However, this is only an example of the present invention. For example, a test write operation may also be performed for the purpose of OPC on the second information storage layer or even on each information storage layer.

Figure 1:
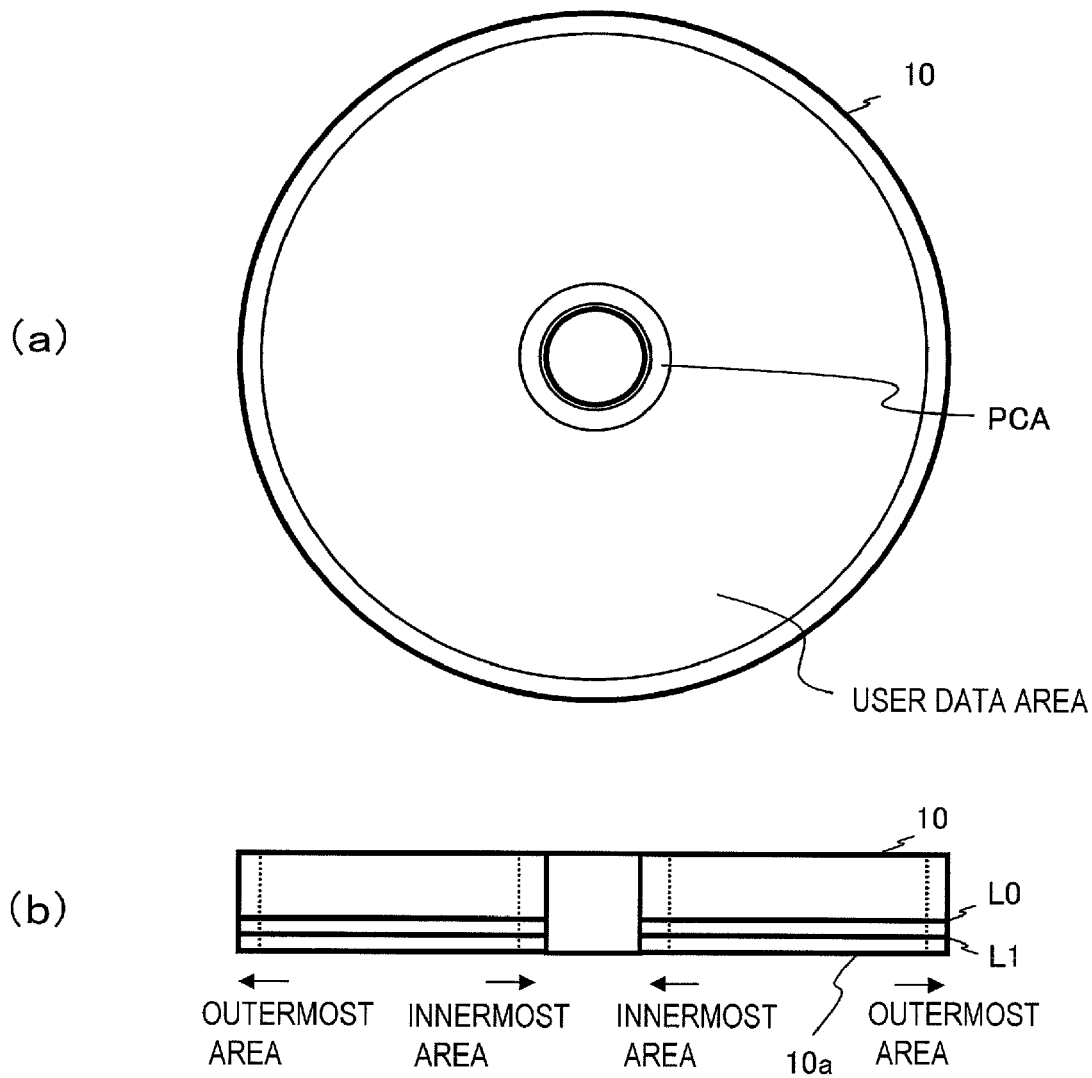
FIG. 1(*a*) illustrates a multilayer optical disc 10 and FIG. 1(*b*) is a schematic cross-sectional view thereof.
Figure 2:
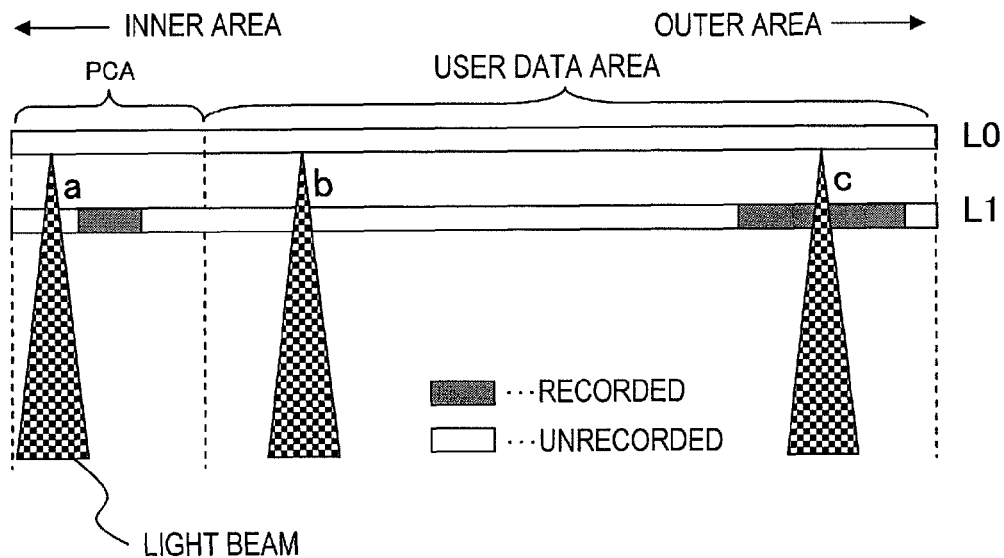
FIG. 2 illustrates in further detail a portion of the cross section of the multilayer optical disc 10 shown in FIG. 1(*b*).
Figure 3:
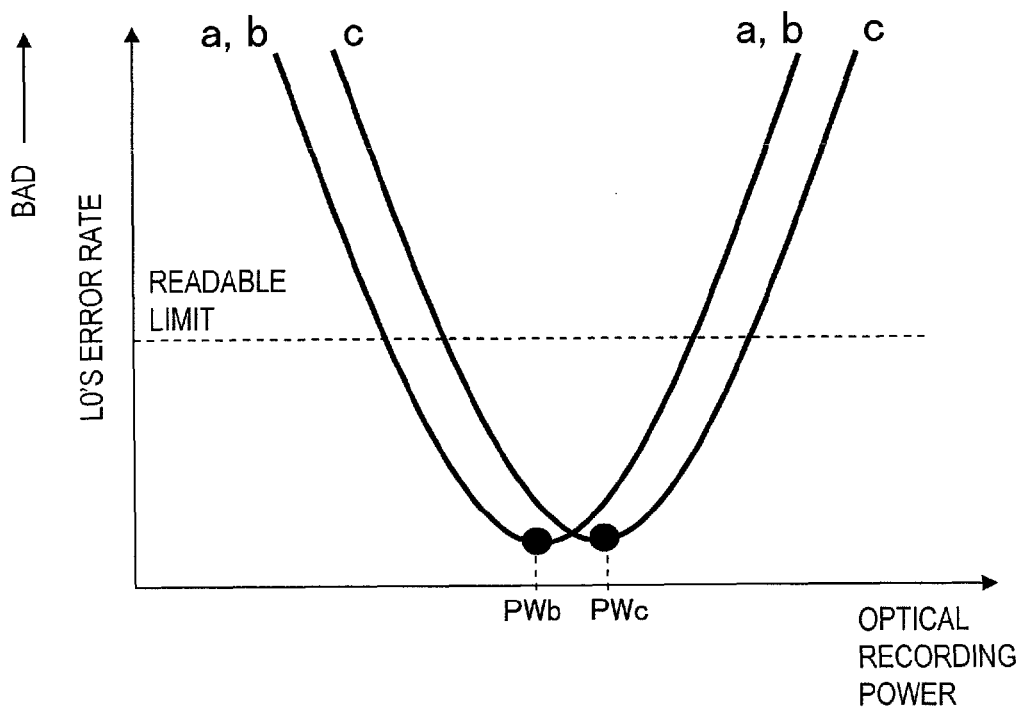
FIG. 3 is a graph showing how the rate of errors caused by reading data from an information storage layer L0 changes with the optical recording power.
Figure 4:
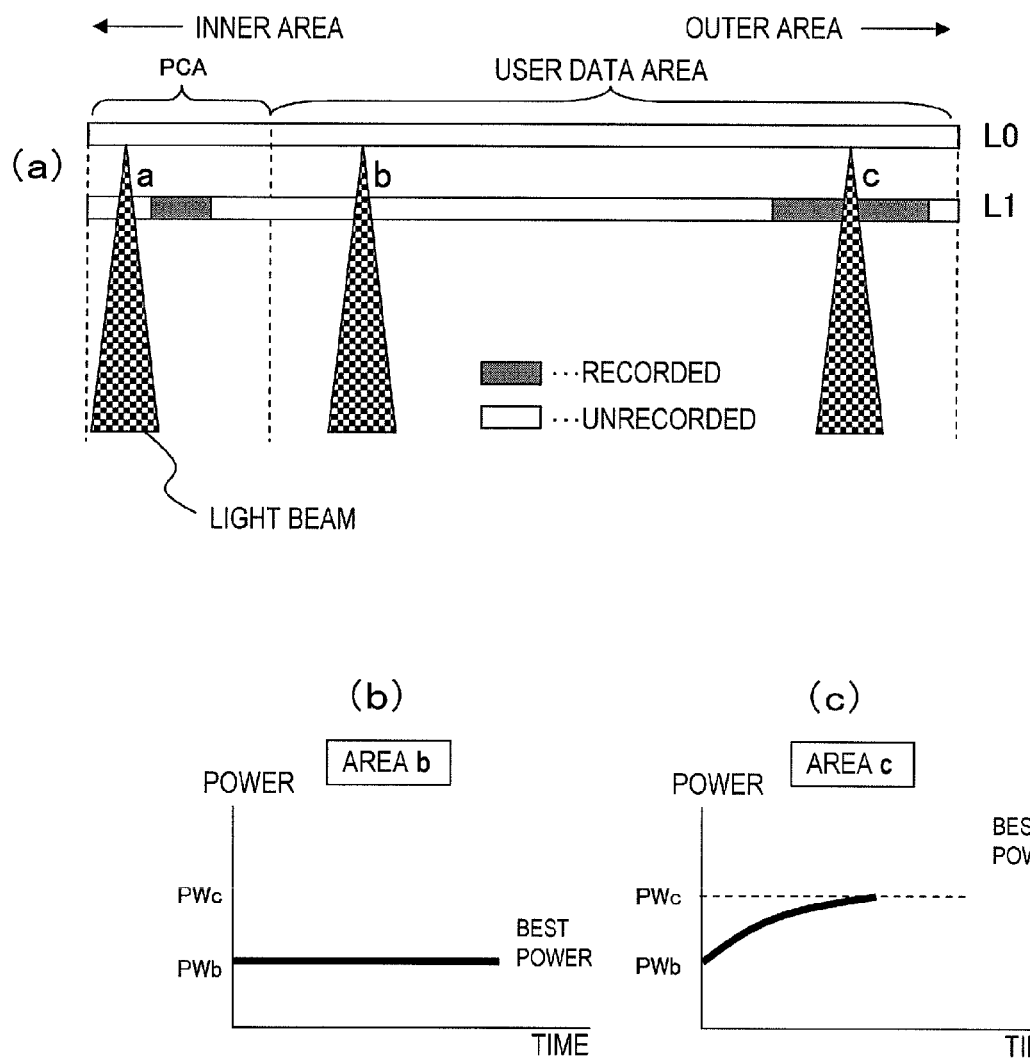
FIG. 4(*a*) is a schematic cross-sectional view of a multilayer optical disc with two information storage layers L0 and L1.
Figure 5:
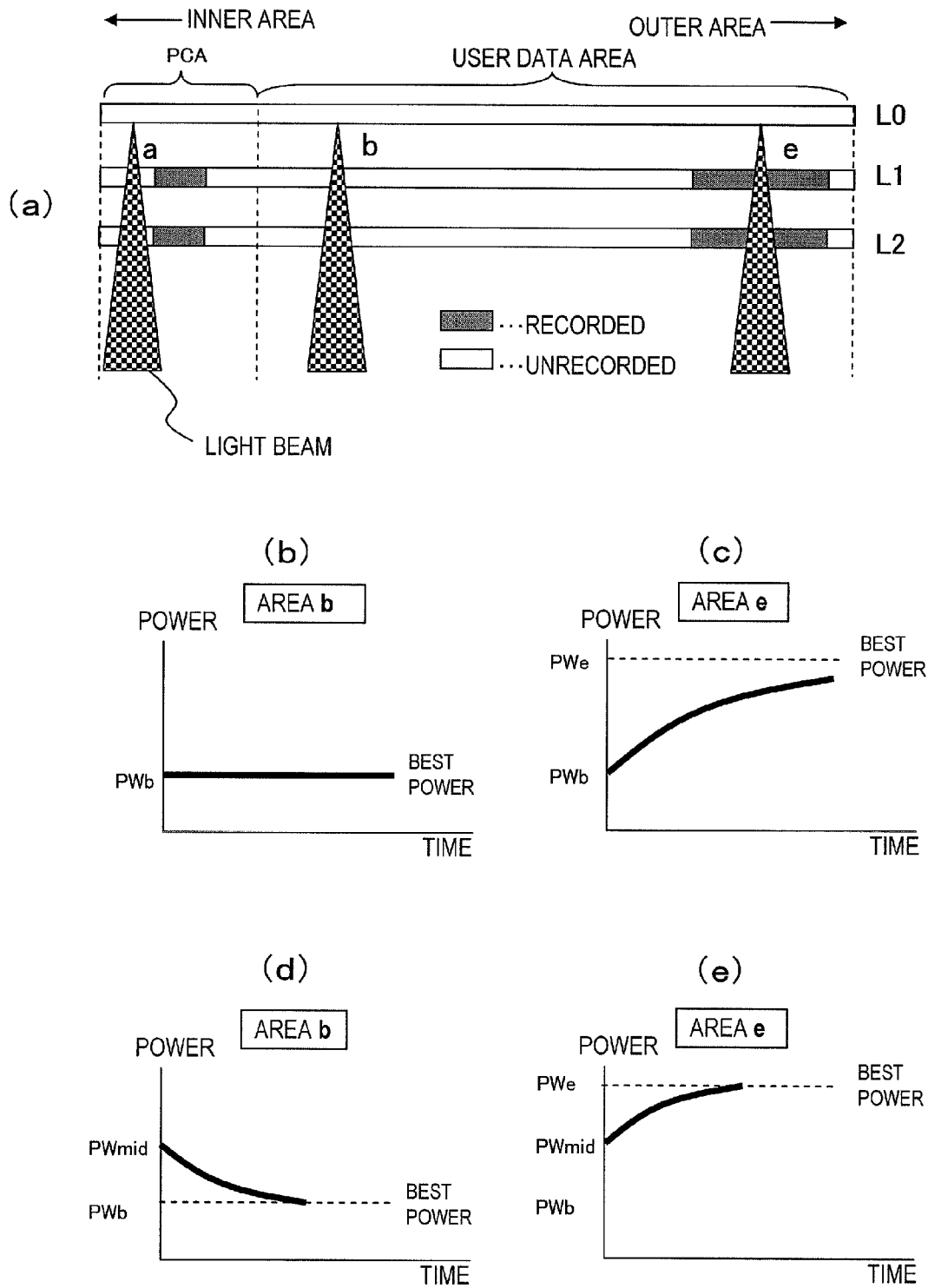
FIG. 5(*a*) is a schematic cross-sectional view of a multilayer optical disc with three information storage layers L0, L1 and L2.

First of all, it will be described with reference to FIGS. 5(d) and 5(e) basically how the present invention works. According to the present invention, an intermediate value PWmid between the optical recording powers for the areas b and e is used as the initial optical recording power as shown in FIGS. 5(d) and 5(e). That is why no matter whether the target location is in the area b or the area e, the recording power always needs to be corrected toward the optimum value based on a β value, for example, after data has started to be written. Nevertheless, according to the present invention, such a correction can get done in a shorter time compared to correcting the recording power all the way from the initial value through the optimum one. Such a β value based correction is sometimes called "running optimum power control (ROPC)" to tell it from a normal OPC on the PCA.

That initial optical recording power to start writing data with is obtained by multiplying a "provisional initial optical recording power" by a correction coefficient to be described later. That "provisional initial optical recording power" is the optimum value (PWa=PWb) of the optical recording power obtained by performing an OPC on the unrecorded area in the test write area.

According to the current optical disc technologies, while a mark is being recorded by irradiating an optical disc with a light beam, the intensity of the light beam is not constant but changed in pulses, and it is determined by write strategy what pulse waveform should be used to record the mark. As used herein, the "optical recording power" refers to the peak value of multiple pulses that form a writing light beam. The peak value of those pulses is constant within a single recorded mark.

Figure 6:
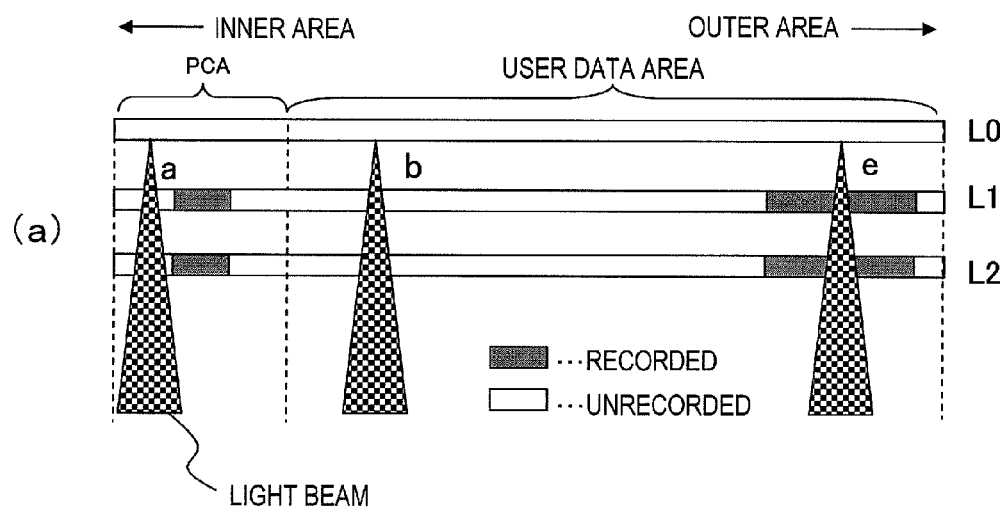
FIG. 6(*a*) is a schematic cross-sectional view of a multilayer optical disc with three information storage layers L0, L1 and L2.
Figure 6:
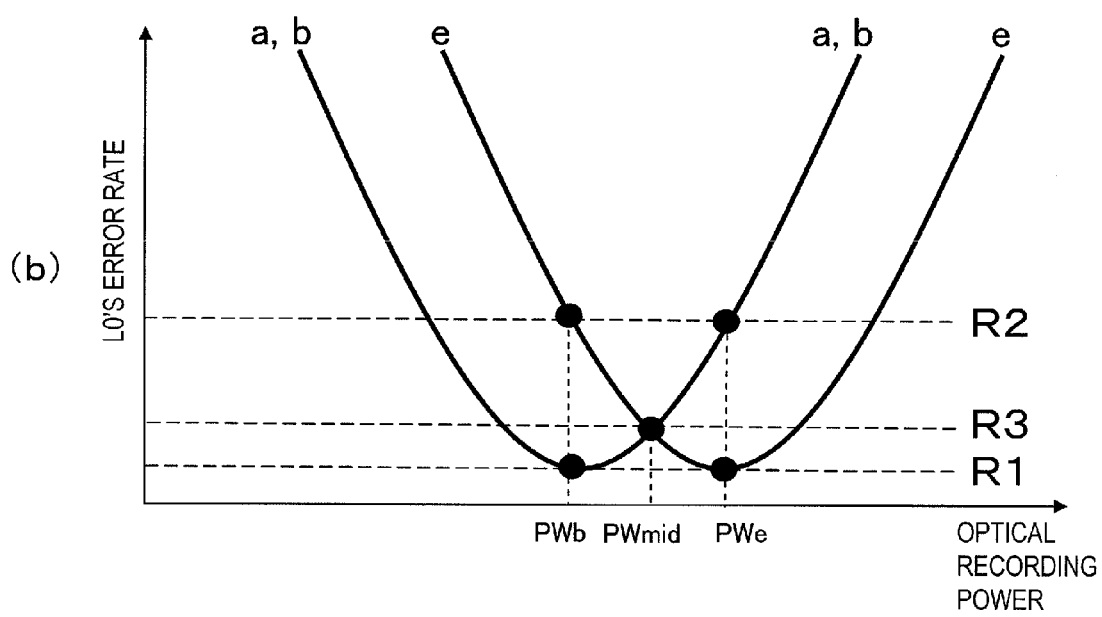

Hereinafter, the relation between the initial optical recording power and the provisional initial optical recording power (PWa=PWb) will be described with reference to FIGS. 6(a) and 6(b). The optical disc shown in FIG. 6 is an optical transmittance decreasing type in which a recorded area has a lower optical transmittance than an unrecorded area. FIG. 6(a) is the same as FIG. 5(a), while FIG. 6(b) shows how the error rate changes with the optical recording power when the data that has been written on an unrecorded storage layer L0 is read from a triple-layer optical disc. Specifically, one curve shown in FIG. 6(b) indicates results that are obtained in the areas a and b, which are unrecorded areas, and the other curve shown in FIG. 6(b) indicates results that are obtained in the area e, which is a recorded area. Similar curves will be obtained even if the ordinates are changed from the error rate into the jitter.

As can be seen from FIG. 6(b), when the optical recording power is PWb, the error rate becomes the lowest in the areas a and b. In the area e, on the other hand, the error rate becomes the lowest when the optical recording power is PWe. In the example shown in FIG. 6(b), the lowest error rate is Level R1. If data were written on the area e with the optical recording power set to be PWb, the error rate would reach Level R2 when the data is read. Likewise, if data were written on the area b with the optical recording power set to be PWe, the error rate would also reach Level R2 when the data is read. And if that Level R2 were higher than the permissible level for reading, then the data would start to be written there in a non-normally-readable state.

In the graph shown in FIG. 6(b), the curve showing the results obtained in the areas a and b and the curve showing the results obtained in the area e have the same shape for the sake of simplicity. However, actual curves may have different shapes. In that case, a local minimum of the curve showing the results obtained in the areas a and b will not be equal that of the curve showing the results obtained in the area e.

In a preferred embodiment of the present invention, when data starts to be written, the optical recording power is set to be PWmid (=PWb×correction coefficient), instead of PWb. In the example shown in FIG. 6(b), the correction coefficient is greater than one. As can be seen from FIG. 6(b), if data is written on the area b with the optical recording power set to be PWmid, the error rate will be Level R3 when the data is read. Likewise, even if data is written on the area e with the optical recording power set to be PWmid, the error rate will also be Level R3 when the data is read. Thus, no matter whether data needs to be written on the area b or the area e, the error rate will never exceed the permissible level when the data written there is read.

Furthermore, according to this preferred embodiment, when data starts to be written, the difference between the initial and optimum values of the optical recording power (i.e., PWe-PWmid or PWmid-Pwb) is much smaller than PWe-PWb. For that reason, it will take a shorter time to correct the optical recording power using a β value after that.

This can be easily seen by comparing FIG. 5(c) to FIGS. 5(d) and 5(e). In the examples shown in FIGS. 5(d) and 5(e), the optical recording power should be corrected with a β value, no matter whether data needs to be written on the area b or the area e, but it never takes too long a time to get the correction itself done unlike the example shown in FIG. 5(c).

Figure 7:
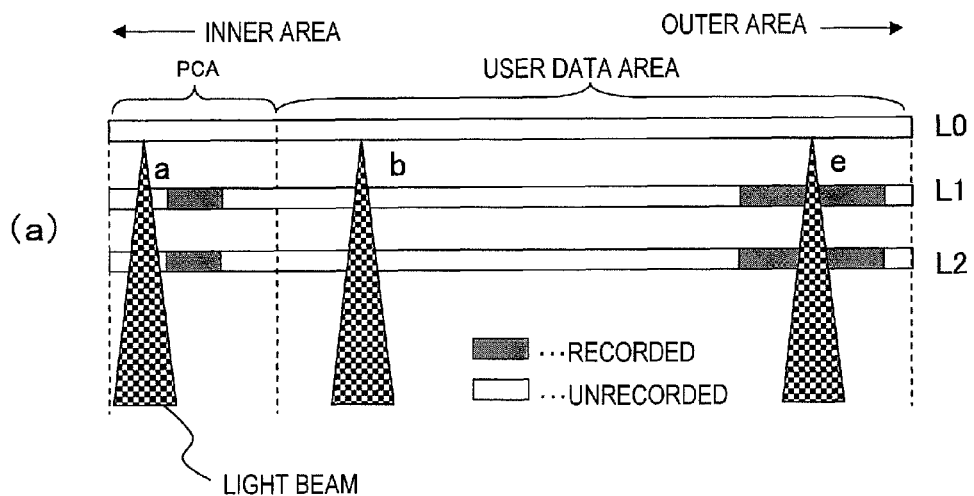
FIG. 7(*a*) is a schematic cross-sectional view illustrating a multilayer optical disc with three information storage layers L0, L1 and L2 in which a recorded area has a higher optical transmittance than an unrecorded area.
Figure 7:
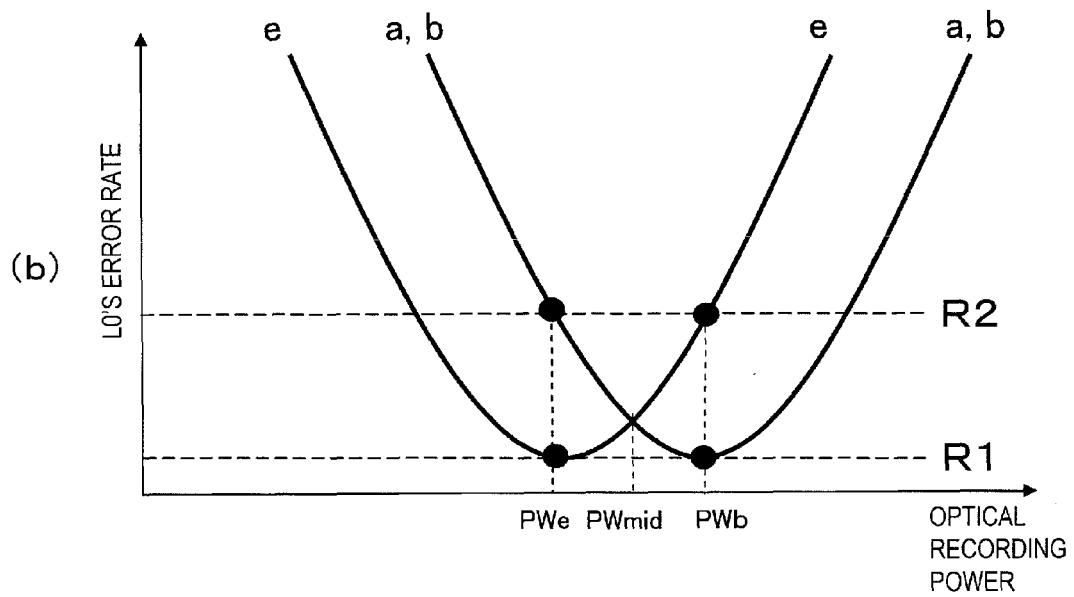

Next, look at FIGS. 7(a) and 7(b), which illustrate an optical transmittance increasing type optical disc in which a recorded area has a higher optical transmittance than an unrecorded area. In such an optical disc, a mark of a preferred shape can be recorded in the recorded area e with lower optical recording power than in the unrecorded areas a and b. In that case, the optimum value PWe for the recorded area becomes smaller than that optimum value PWb for the unrecorded areas. Even in the example illustrated in FIG. 7, according to this preferred embodiment, the optical recording power is also set to be PWmid (=PWb×correction coefficient). In that case, the correction coefficient becomes smaller than one.

Figure 8:
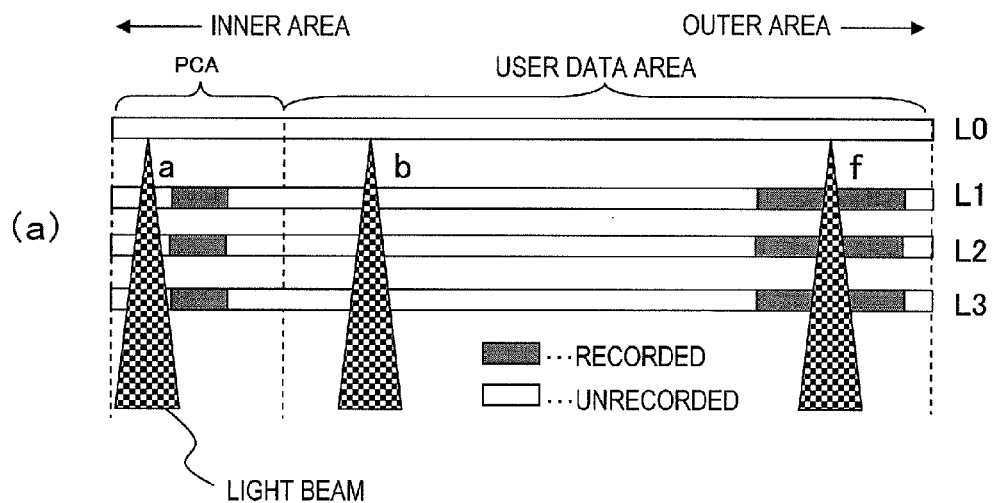
FIG. 8(*a*) is a schematic cross-sectional view illustrating a multilayer optical disc with four information storage layers L0, L1, L2 and L3.
Figure 8:
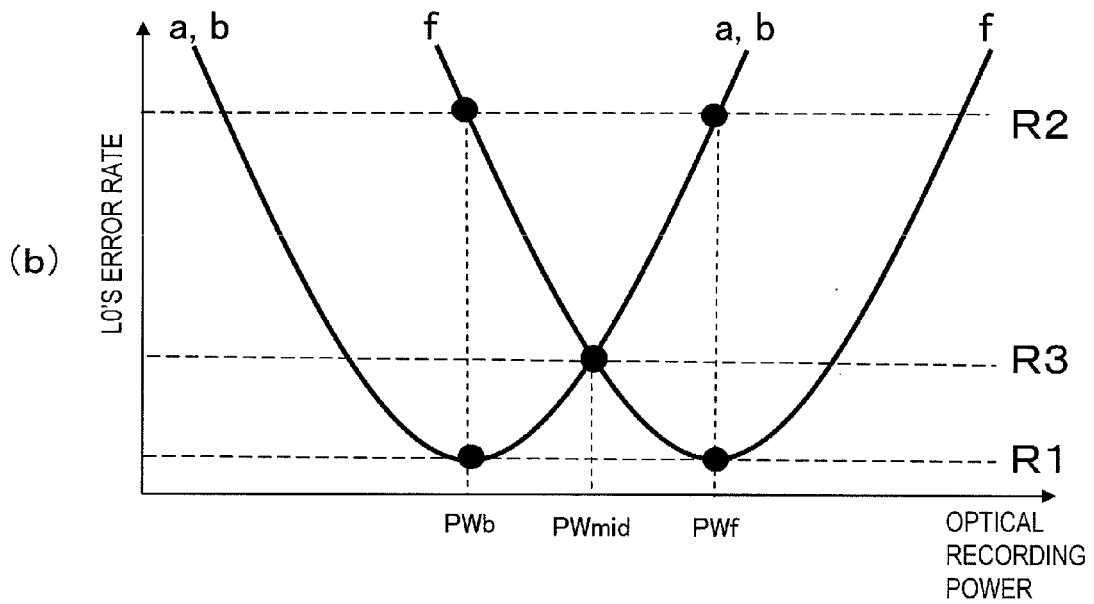

Next, look at FIGS. 8(a) and 8(b). FIG. 8(a) schematically illustrates a cross section of a quadruple-layer disc, which is an optical transmittance decreasing type. In the recorded area f, data has already been written in three information storage layers L1, L2 and L3. FIG. 8(b) shows how the error rate changes with the optical recording power when the data that has been written on the information storage layer L0 is read from the quadruple-layer optical disc. Specifically, one curve shown in FIG. 8(b) indicates results that are obtained in the areas a and b, which are unrecorded areas, and the other curve shown in FIG. 8(b) indicates results that are obtained in the area f, which is a recorded area.

In the example illustrated in FIG. 8(b), there is a bigger difference between the optimum values PWf and PWb of the optical recording powers. That is why the correction coefficient, by which PWb is multiplied in order to obtain the intermediate value PWmid, also needs to be increased.

FIG. 9 is a table showing examples of correction coefficients. In the example shown in FIG. 9, as the structure and material of an optical disc change from one disc manufacturer to another, the correction coefficients are set to be multiple different values. The value of the correction coefficient is also variable with the number of information storage layers that the light beam should pass to reach the target information storage layer on which data needs to be written. For example, as for a triple-layer BD-R disc manufactured by Company A, when data is written on the information storage layer L0, the correction coefficient is 1.30. However, when data is written on the information storage layer L1 of the same disc, the correction coefficient should be 1.15. The reason is as follows.

Specifically, when data is written on the information storage layer L0, there are two information storage layers L1 and L2 that are located shallower than the target information storage layer L0. That is to say, the light beam focused on the information storage layer L0 should pass those two information storage layers L1 and L2. On the other hand, when data is written on the information storage layer L1, there is only one information storage layer L2 that is shallower than the target information storage layer L1. That is why the light beam focused on the information storage layer L0 should pass only that information storage layer L2. Generally speaking, the smaller the number of information storage layers to pass, the smaller the magnitude of the difference between the respective optimum values PWe and PWb of the recorded and unrecorded areas. As a result, the intermediate value PWmid is set to be closer to PWb and the correction coefficient becomes closer to one, too. If the total number of information storage layers included in a multilayer optical disc is X (which is an integer that is equal to or greater than two), the correction coefficient may be equal to one when data is written on the $X^{th}$ information storage layer.

As can be seen, the correction coefficient depends on the type of the given multilayer optical disc (such as the disc type described above), and therefore, needs to be determined in advance for each of multiple different types of optical discs. For that purpose, PWb should be determined on an information storage layer basis for each of multiple different types of optical discs by performing a test write operation on that disc and defining the relation between the index (such as the error rate or jitter) of a read signal and the optical recording power. In addition, the correction coefficient (PWmid/PWb) should also be calculated by determining PWmid on an information storage layer basis for each optical disc. In this manner, the correction coefficient data shown in FIG. 9, for example, can be obtained. The magnitude of PWmid may be determined by obtaining the two curves shown in FIG. 6(b), for example, through a test write operation and then calculating the intermediate value between the local minimum values PWb and PWe of those curves. However, PWmid does not always have to be equal to (PWb+PWe)/2 but may be anywhere between the local minimum values PWb and PWe.

The correction coefficient data is preferably stored in the memory of an optical disc drive. After the optical disc drive has been purchased by a user, the correction coefficient stored in the memory of the optical disc drive may be updated over telecommunications lines or broadcasting waves for a new type of optical discs to be manufactured. Alternatively, the correction coefficient of each optical disc may be recorded in the optical disc itself. In that case, the optical disc drive may read the correction coefficient data from an optical disc loaded and may calculate the initial optical recording power using that correction coefficient.

In a preferred embodiment of the present invention, in order to select an appropriate correction coefficient for use to calculate PWmid based on PWb, the optical disc drive recognizes the type of the optical disc loaded into it, and then retrieves the most appropriate correction coefficient for that optical disc from a memory in which the data shown in FIG. 9, for example, is stored. If no appropriate correction coefficient for the given optical disc is available from the memory, then the correction coefficients may be updated at that time. Or the correction coefficient of a disc with the same number of information storage layers as the loaded one may be used as a replacement. The type of the given optical disc may be recognized by any known method but may also be recognized by retrieving disc information from the management area of its reference layer (e.g., the information storage layer L0).

Next, the β value will be described with reference to FIG. 10, which is a graph schematically illustrating the waveform of a read signal (RF signal) obtained from an area on which data has been written. Supposing the average value of the RF signal is identified by A and the amplitudes of respective portions of the waveform that are over and under the average value A are identified by P and B, respectively, the β value can be calculated by (P−B)/(P+B). The higher the degree of symmetry between those two portions that are respectively over and under the average value A, the closer to zero the β value gets. In the example illustrated in FIG. 10, P>B, and therefore, the β value is positive. On the other hand, if P<B, then the β value becomes negative.

In this description, the β value obtained when a recorded mark has the best shape or size will be identified herein by "β_best". In a preferred embodiment of the present invention, using the β value as an index, the optical recording power is corrected from the initial setting PWmid into another value. If the β value is greater than β_best, then the optical recording power is corrected so as to decrease the β value. On the other hand, if the β value is smaller than β_best, then the optical recording power is corrected so as to increase the β value. In this manner, the optical recording power is corrected so that the β value becomes substantially equal to β_best. Such an optical recording power correction is made while user data is being written on the user data area.

Figure 11:
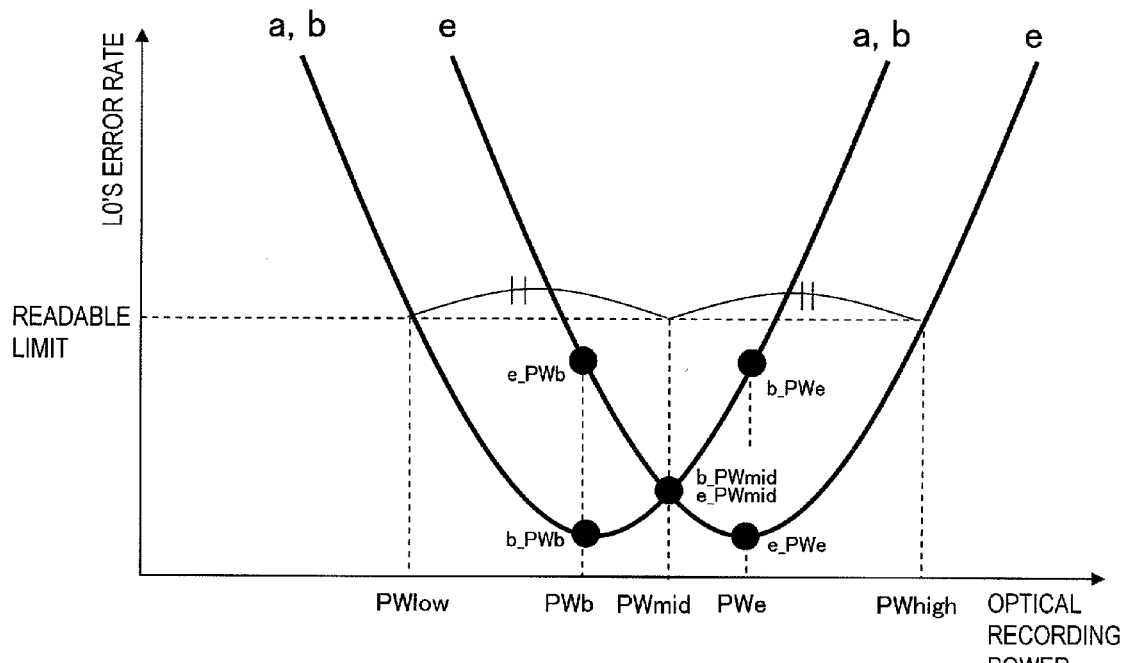
FIG. 11 is a graph showing how the error rate changes with the optical recording power when the data that has been written on the information storage layer L0 is read from a triple-layer optical disc.

Next, the relation between the β value and the optical recording power will be described with reference to FIGS. 11 and 12. FIG. 11 is a graph just like the one shown in FIG. 6($b$). In FIG. 11, shown are the lower and upper limits values PWlow and PWhigh that define an optical recording power range in which the error rate is equal to or smaller than the permissible limit for reading (which will be referred to herein as a "readable limit"). Also shown in FIG. 11 are error rates b_PWb and e_PWb associated with the optimum value PWb of the optical recording power for the unrecorded area, error rates e_PWe and b_PWe associated with the optimum value PWe of the optical recording power for the recorded area, and error rates e_PWmid and b_PWmid associated with the intermediate value PWmid between those two optical recording powers.

PWmid may be set to be equal to the average of the two optical recording powers PWlow and PWhigh that define the readable limits. If the two curves shown in FIG. 11 have significantly asymmetric shapes, PWmid is preferably the average of the two optical recording powers PWlow and PWhigh that define the readable limits. However, the intermediate value does not have to be the average value in a strict sense and just needs to be different as much as possible from both of the upper and lower limits of the optical recording powers that define the readable limits. For example, if the curves shown in FIG. 11 are steep on the left-hand side but gentle on the right-hand side and if data is written on the area e with the optical recording power that is the average of PWb and PWe, then chances of exceeding the readable limits are high.

However, if the average of PWlow and PWhigh is set to be equal to PWmid and if data is written with that optical recording power, then data can be written on the areas b and e so that the data can be easily read from both of those areas.

PWmid is set in advance on a disc-by-disc basis. To do that, the relation between the optical recording power and the error rate should be defined by making actual measurements on both of the unrecorded and recorded areas of various types of optical discs. Specifically, by calculating how much the local minimum value PWb (=PWa) that has been obtained from the unrecorded area should be multiplied to get PWmid that has been set by the method described above, the correction coefficient (PWmid/PWb) can be obtained. On the other hand, when the optical disc drive performs an OPC on an optical disc loaded, a test write operation needs to be performed on only an unrecorded area in the PCA of the optical disc. That is to say, when the OPC is performed, PWmin can be determined by multiplying PWb that has been obtained from the unrecorded area by the correction coefficient.

It should be noted that PWmid is not always obtained by multiplying PWb by the correction coefficient. Alternatively, PWe may also be obtained from the recorded area in the PCA and then PWmid may be calculated based on PWe. In that case, the PWmid/PWe value is calculated and stored in the memory in advance as the correction coefficient.

Figure 12:
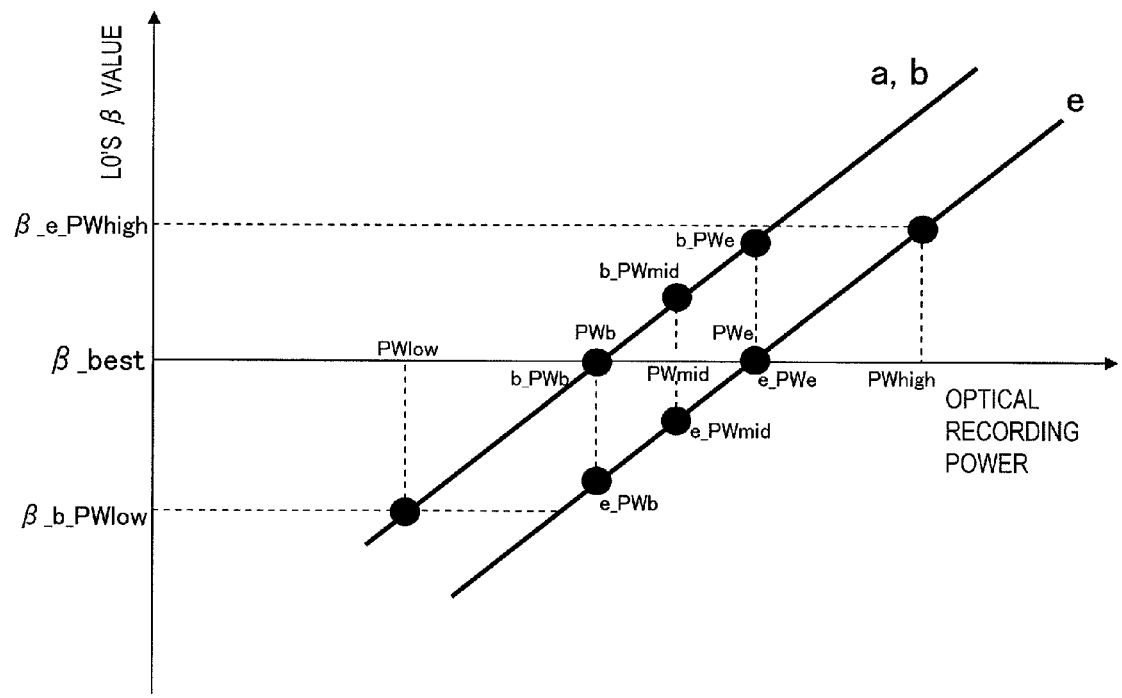
FIG. 12 is a graph schematically showing the relations between the β value and the optical recording power.

FIG. 12 is a graph schematically showing the relations between the β value and the optical recording power. In FIG. 12, shown are a line representing the relation in the areas a and b and a line representing the relation in the area e. In the areas a and b, the Q value becomes equal to β_best when the optical recording power is PWb. On the other hand, in the area e, the β value becomes equal to β_best when the optical recording power is PWe. In any of these areas, the higher the optical recording power, the greater the β value. This is because the higher the optical recording power, the smaller B shown in FIG. 10 tends to be. In FIG. 12, also shown are β_b_PWlow and β_e_PWhigh, which are β values associated with the readable limits.

Hereinafter, an exemplary configuration for an optical disc drive as a preferred embodiment of the present invention will be described with reference to FIG. 13.

An optical disc drive according to this preferred embodiment includes an optical head 11 for optically accessing an optical disc 10, and a front end processor (FEP) 12 and a laser driver 30, which are connected to the optical head.

The optical disc 10 is a recordable optical disc, which may be a BE-R or a BD-RE, for example. When loaded into this optical disc drive, the optical disc 10 is rotated by a motor (not shown) and then irradiated with a light beam by the optical head 11.

The optical head 11 includes a laser light source (not shown) for emitting a light beam and a photodetector (not shown, either) for receiving the light that has been reflected from the optical disc 10.

The FEP 20 receives the output signal of the optical head 11, performs amplification and waveform equalization on that signal, and then outputs the processed analog signal to a read processing section 21. In response, the read processing section 21 converts the analog signal that has been received from the FEP 20 into a digital signal. Then, a decoder 22 receives the digital signal from the read processing section 21 and demodulates it, thereby decoding and outputting user data (e.g., video data) that has been stored on the optical disc 10.

The laser driver 30 drives the laser light source in the optical disc 11 with a write waveform that has been received from a write processing section 31, thereby making the optical head 11 emit a light beam. The write processing section 31 receives a write signal from an encoder 32 and sets the write waveform. When writing user data on the optical disc 10, the encoder 32 receives and modulates the data to write (e.g., video data), thereby generating an encoded write signal and inputting it to the write processing section 31.

A target β value storage memory 23 receives a target β value, which has been obtained by performing a test write operation after the OPC, from the read processing section 21 and stores it. The target β value is used to correct the laser power during a write operation.

The optical disc drive of this preferred embodiment includes the target β value storage memory 23 and a correction coefficient storage memory 33. The target β value storage memory 23 receives the target β value, which has been obtained by performing a test write operation after the OPC, from the read processing section 21 and stores it. As described above, this target β value is used to correct the optical recording power while the user data is being written. On the other hand, the correction coefficient storage memory 33 stores an initial optical recording power correction coefficient. The correction coefficient may be stored as the data included in the table shown in FIG. 9, for example, in the correction coefficient storage memory 33. When setting the write waveform, the write processing section 31 receives the initial optical recording power correction coefficient from the correction coefficient storage memory 33 and sets the initial optical recording power using the coefficient.

Figure 10:
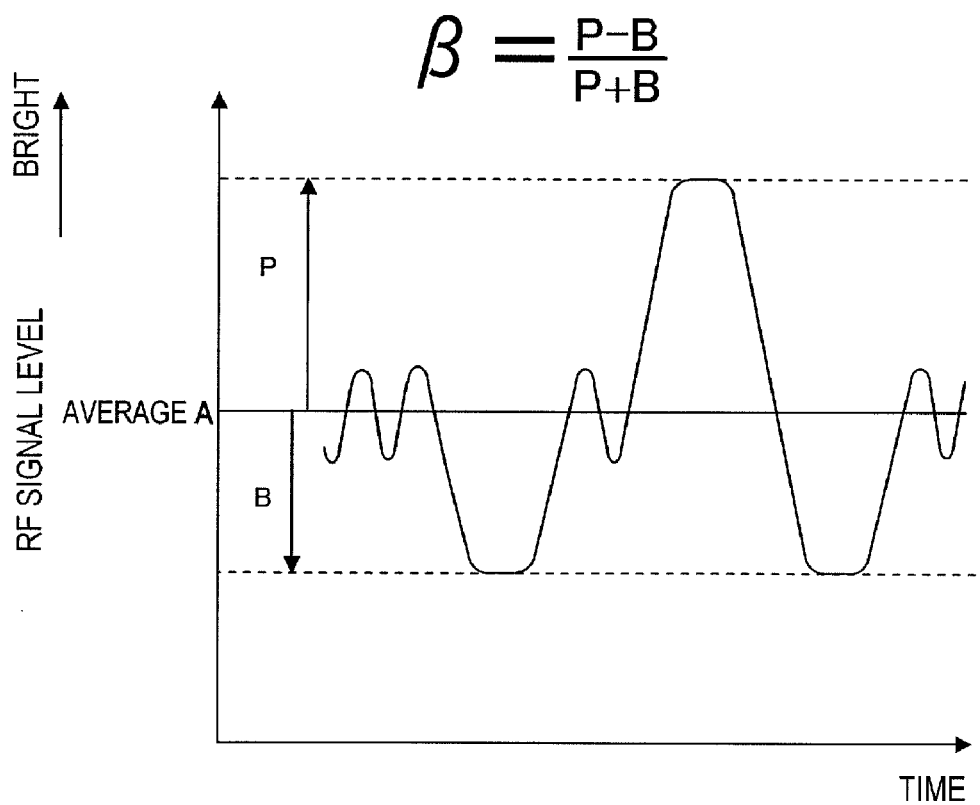
FIG. 10 is a graph schematically illustrating the waveform of a read signal (RF signal) obtained from an area on which data has been written.

The FEP 20 includes means for calculating the average A and amplitudes B and P, which need to be used to calculate the β value as shown in FIG. 10.

Using the average A and the amplitudes B and P that have been detected by the FEP 20, the read processing section 21 calculates the β value as described above. Then, the write processing section 31 corrects the write waveform based on the β value when writing the user data (i.e., performing an ROPC).

The optical disc drive of this preferred embodiment stores the correction coefficient, which needs to be used to determine the initial optical recording power, in the memory, which is a major difference from a conventional optical disc drive. However, the other components of the optical disc drive of this preferred embodiment may be similar to their counterparts of the conventional optical disc drive.

Figure 14A:
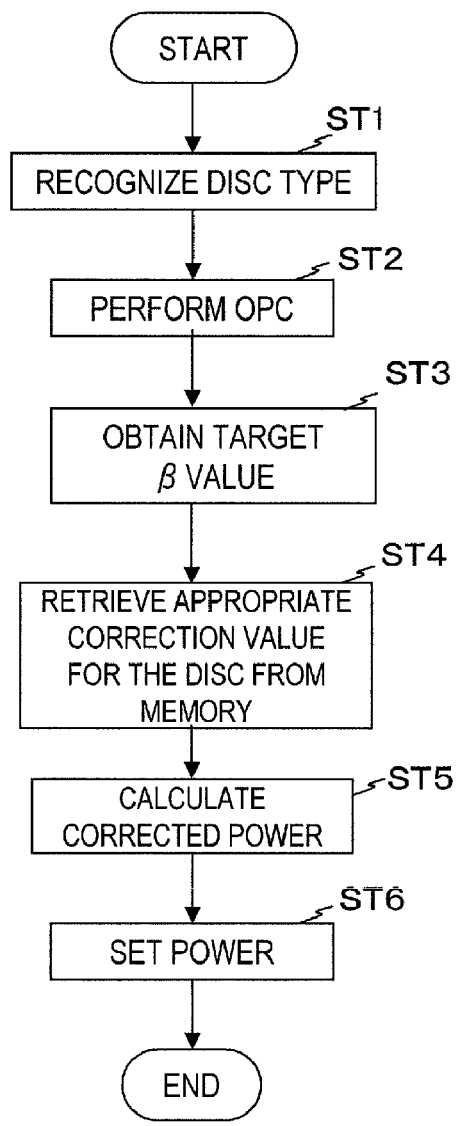
FIG. 14A is a flowchart showing the procedure of an exemplary power setting method according to a preferred embodiment of the present invention.

Next, an exemplary power setting method according to this preferred embodiment will be described with reference to FIG. 14A.

First, in Step ST1, disc type recognition is carried out on the optical disc that had been loaded into the optical disc drive. Suppose an optical disc with three information storage layers such as the one shown in FIG. 6 has been loaded. In that case, with the light beam focused on the information storage layer L0, disc information is retrieved from the management area of the information storage layer L0, thereby recognizing the type of the optical disc loaded. Specifically, based on the information that has been retrieved from the management area, the manufacturer and the total number of information storage layers included are determined.

Next, in Step ST2, an OPC is performed on the PCA of the information storage layer L0. In this processing step, a test write operation is performed on the unrecorded area (where no data has been written yet) of every information storage layer that is shallower than the information storage layer L0. The OPC is carried out by tentatively writing data with the optical recording power changed in multiple stages. As a result, the optical recording power PWb that has resulted in the lowest error rate is obtained. After the test write operation has been done in this manner, the target β value β_best is obtained in the next processing step ST3 by reading the data that has been written with the optical recording power PWb. In addition, by using β values that have been obtained by reading the data that have been written with optical recording powers other than the optical recording power PWb as well as the target β value, the relation between the β value and the optical recording power (e.g., the line for the area a shown in FIG. 12) is also defined.

Figure 13:
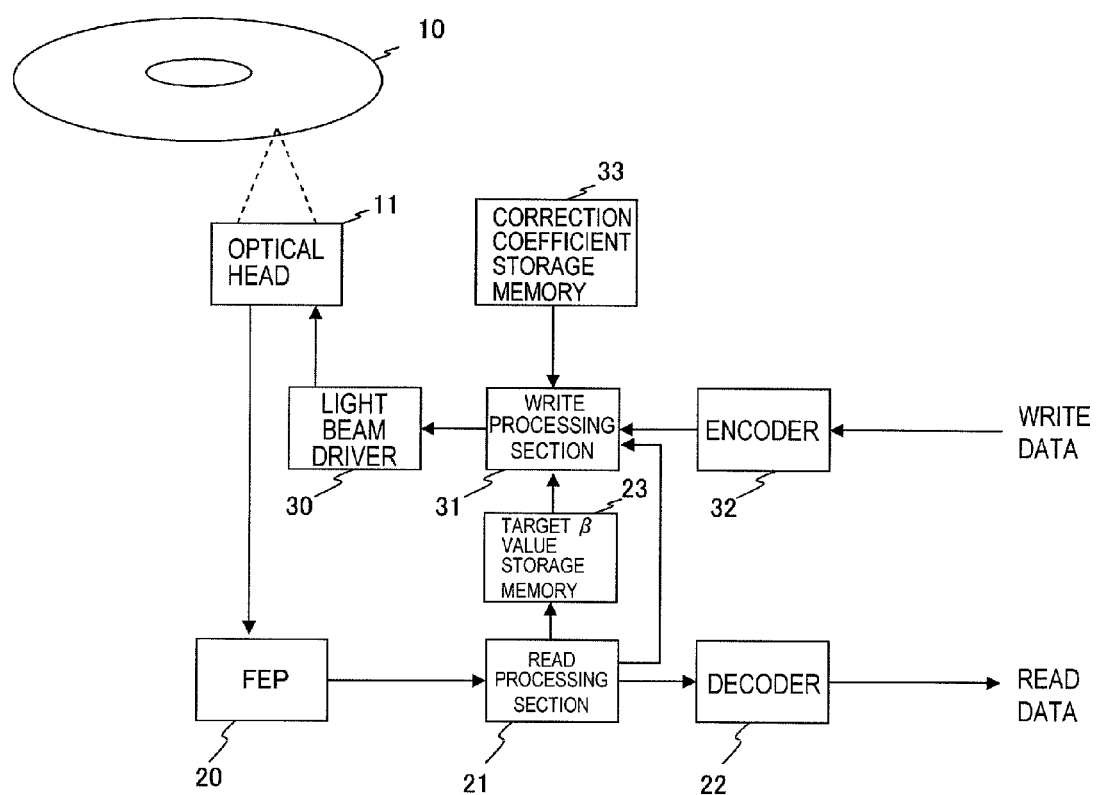
FIG. 13 is a block diagram illustrating an exemplary configuration for an optical disc drive according to the present invention.

Thereafter, in Step ST4, according to the type of the disc that has been recognized as a result of the disc type recognition and the target information storage layer of writing, an appropriate correction coefficient is retrieved from the correction coefficient storage memory 33 shown in FIG. 13. Subsequently, in Step ST5, the optimum value PWb of the optical recording power for the areas a and b is multiplied by the correction coefficient, thereby calculating corrected power. And then in Step ST6, this corrected power is set to be the initial optical recording power.

Figure 14B:
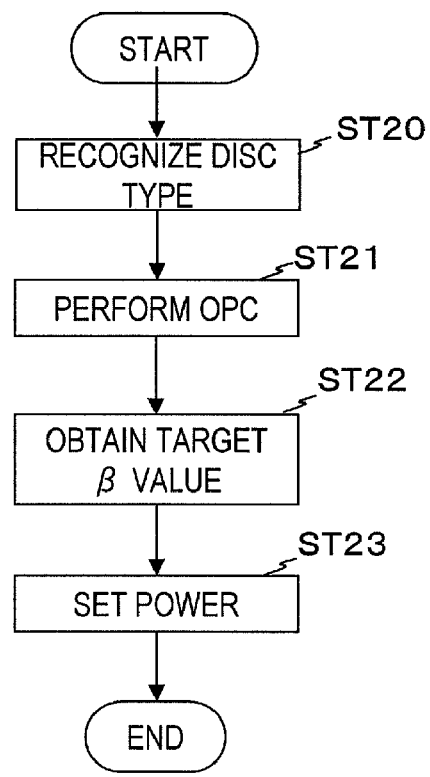
FIG. 14B is a flowchart showing the procedure of a conventional power setting method.

FIG. 14B is a flowchart showing, for the purpose of comparison, the procedure of a typical conventional power setting method. In the example illustrated in FIG. 14B, the processing steps ST20 to ST22 are the same as the processing steps ST1 to ST3, respectively. In this case, however, when the power is set in Step ST23 after the target β value has been obtained, the optimum value PWb of the optical recording power that has been obtained by performing a test write operation on the area a is set to be the initial optical recording power.

Figure 15:
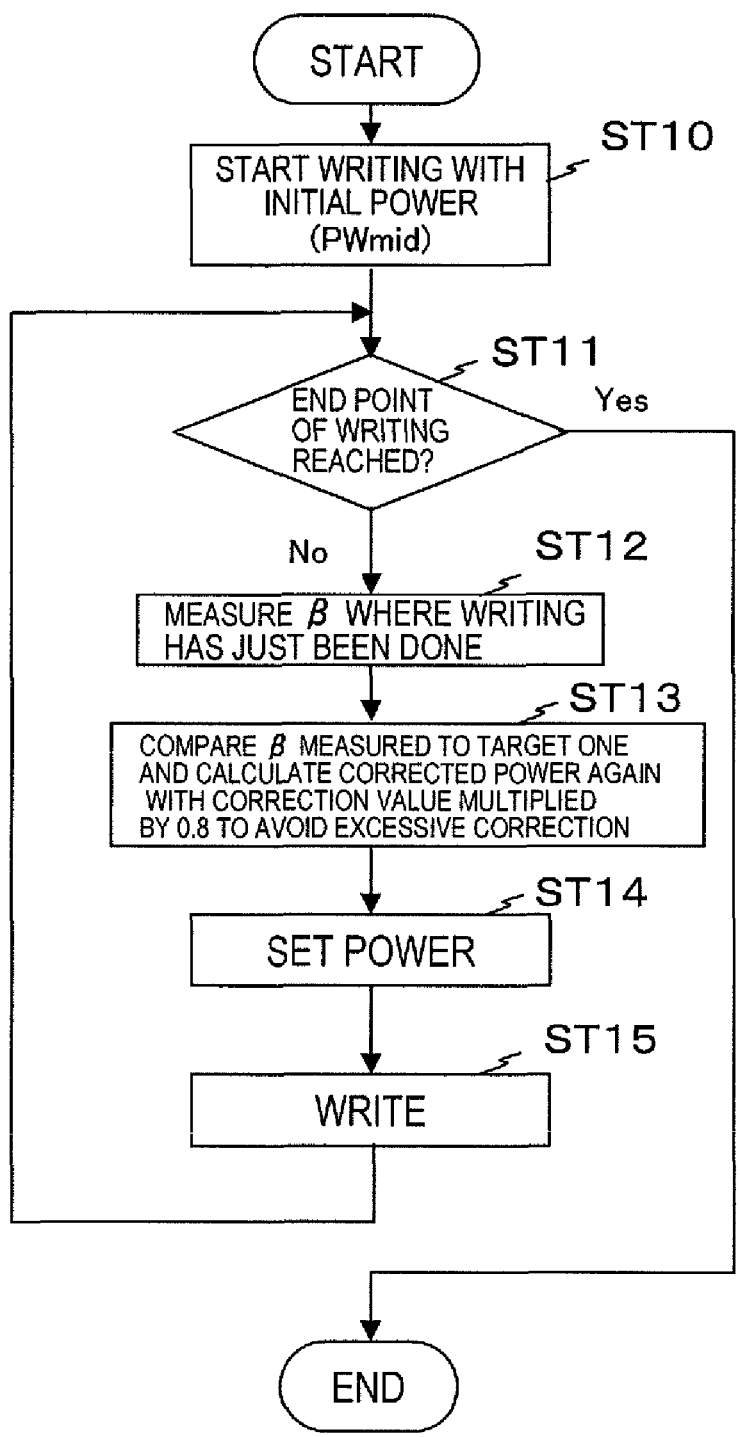
FIG. 15 is a flowchart showing the procedure of an exemplary data writing method according to a preferred embodiment of the present invention.

Hereinafter, a data writing method according to this preferred embodiment will be described with reference to FIG. 15.

Suppose the initial optical recording power has already been set by the method that has been described with reference to FIG. 14A. According to this preferred embodiment, in Step ST10, user data starts to be written with an optical recording power PWmid (=PWb×correction coefficient). Next, if the end point of writing has not been reached yet, the β value is measured at the location on which a write operation has just been performed (in Steps ST11 and ST12).

Next, in Step ST13, the β value measured is compared to the target β value. If the β value measured turns out to be greater than the target β value, the optical recording power is decreased. Conversely, if the β value measured turns out to be smaller than the target β value, the optical recording power is increased. In this processing step, if the difference Δβ between the β value measured and the target β value can be known by the gradient of the line shown in FIG. 12, then a variation ΔPW in optical recording power can be calculated based on the gradient of the line shown in FIG. 12. That is to say, if the gradient of the line shown in FIG. 12 is h, ΔPW× h=Δβ is satisfied. That is why if Δβ is obtained by measurement, the optical recording power just needs to be increased or decreased by Δβ/h. According to this preferred embodiment, however, instead of changing the optical recording power by Δε/h at a time, data is written with the optical recording power changed by 0.8×Δβ/h (in Steps ST14 and ST15). Thereafter, when the data that has been written in such a state is read, the β value will be measured again and the optical recording power will be changed by 0.8×Δβ/h once again. By controlling the optical recording power in this manner so that the β value measured gradually gets closer to the target β value stepwise, the optical recording power can be optimized just as intended without exceeding the readable limits.

After the data has been written in this manner, it is determined in Step ST11 whether or not the writing end point has been reached. If the answer is YES, this data writing operation ends. Otherwise, the same series of processing steps are performed all over again.

Figure 16:
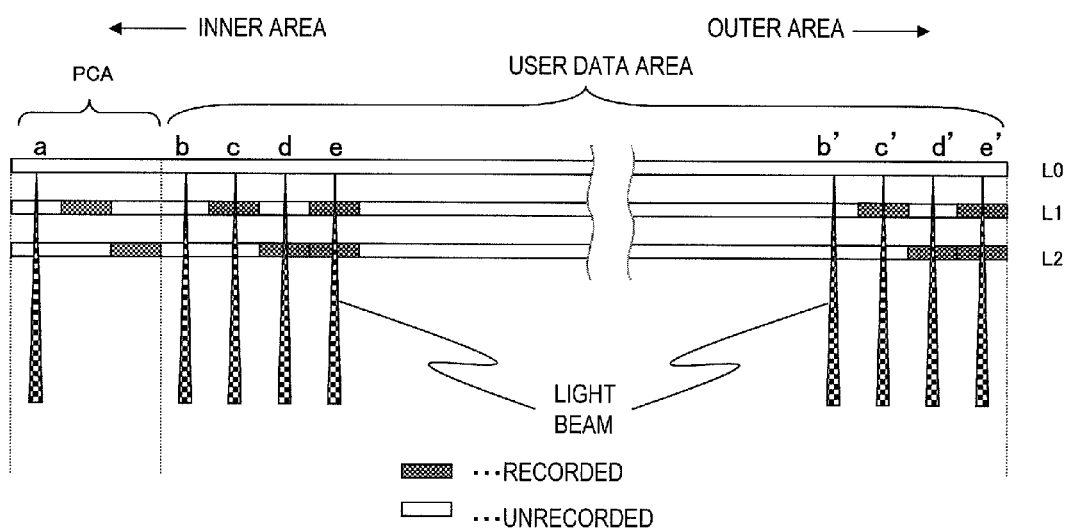
FIG. 16 schematically illustrates a cross section of an optical disc, of which the sensitivity decreases outward (i.e., from the innermost area of the disc toward the outermost area thereof).
Figure 17:
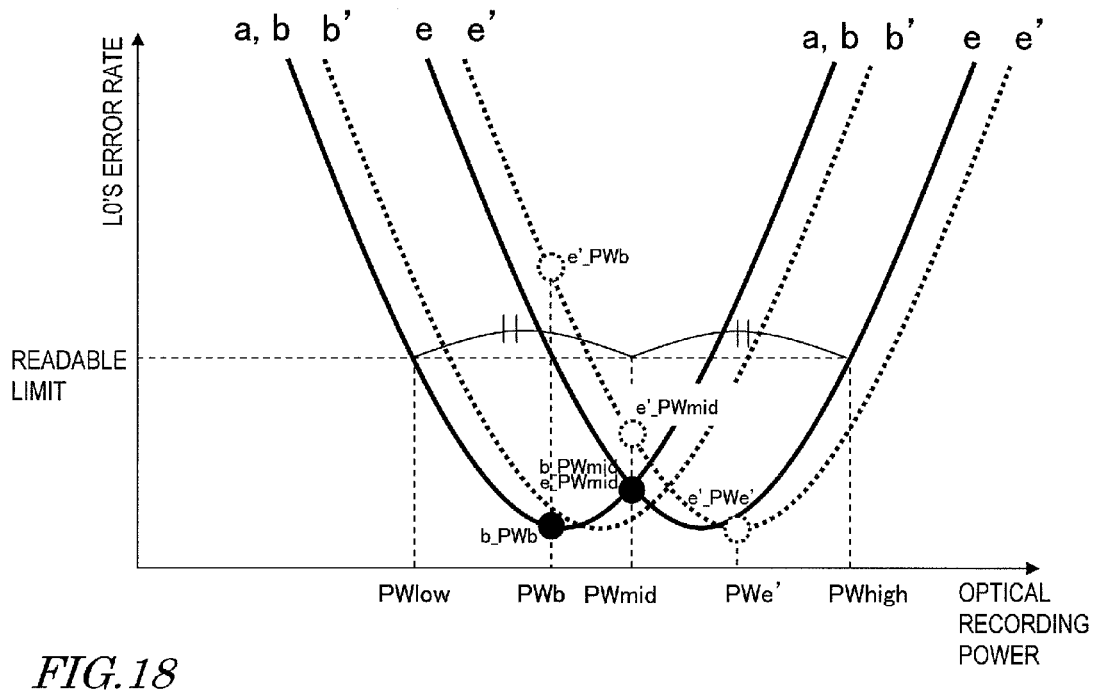
FIG. 17 is a graph showing how the error rate changes with the optical recording power in areas a, b, b', e and e'.
Figure 18:
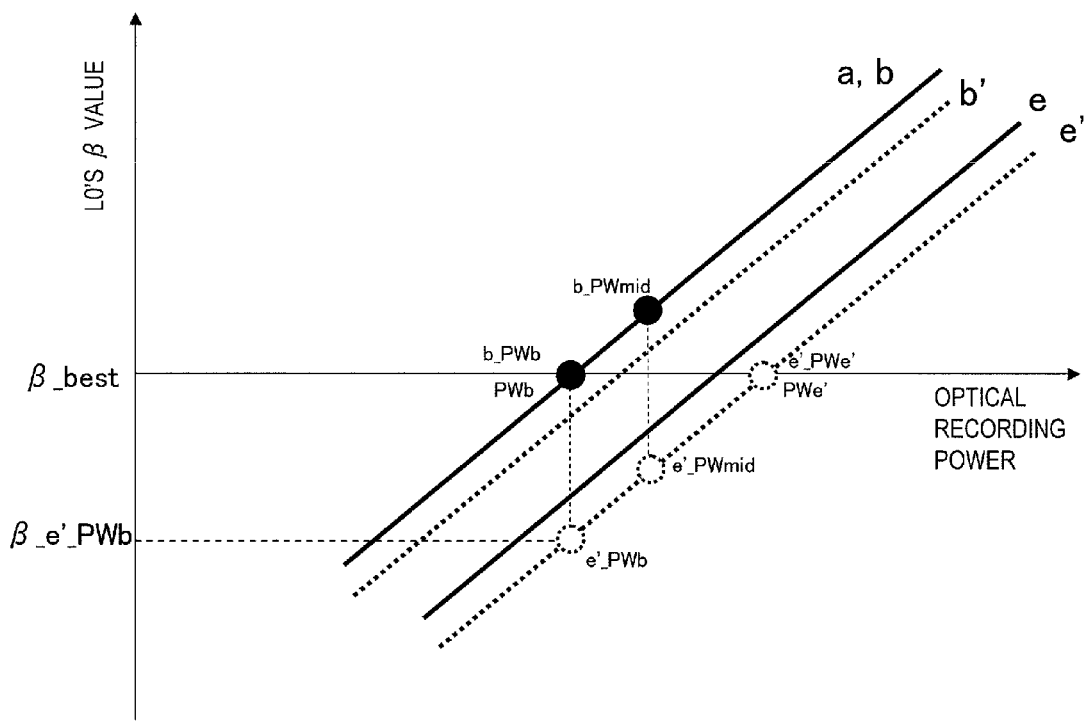
FIG. 18 is a graph showing how the β value changes with the optical recording power in the areas a, b, b', e and e'.

In an actual optical disc, however, the sensitivity of an information storage layer to the optical recording power may vary from one area to another. FIG. 16 schematically illustrates an example of an optical transmittance decreasing type optical disc, of which the sensitivity decreases outward (i.e., from the innermost area of the disc toward the outermost area thereof). In FIG. 16, areas b', c', d' and e' have lower sensitivities than their associated areas b, c, d and e, respectively. This point will be further described with reference to FIGS. 17 and 18. FIG. 17 is a graph showing how the error rate changes with the optical recording power in the areas a, b, b', e and e'. Meanwhile, FIG. 18 is a graph showing how the β value changes with the optical recording power in the areas a, b, b', e and e'.

In the areas b' and e', higher optical recording power is needed to achieve the same error rate or the same β value than in the areas b and e. This is because since the areas b' and e' have lower sensitivities, higher optical recording power should be applied to realize the same state.

In a preferred embodiment of the present invention, the initial optical recording power is determined by performing a test write operation on the area a, which has as high sensitivity as the area b. Since the initial optical recording power is set to be PWmid (=PWb×correction coefficient), the error rate in the area e' is e'_PWmid as can be seen from FIG. 17 when data starts to be written on the area e'. If data started to be written on the area e' with the initial optical recording power set to be PWb as in the conventional method, the error rate in the area e' would be e'_PWb, which is higher than the readable limit, in the example illustrated in FIG. 17. Thus, according to this preferred embodiment, even if data starts to be written on an area with relatively low sensitivity, the error rate is much less likely to exceed the readable limit.

Next, it will be described with reference to FIG. 19 how the β value, the optical recording power, and the error rate may change while data is being written.

Figure 19:
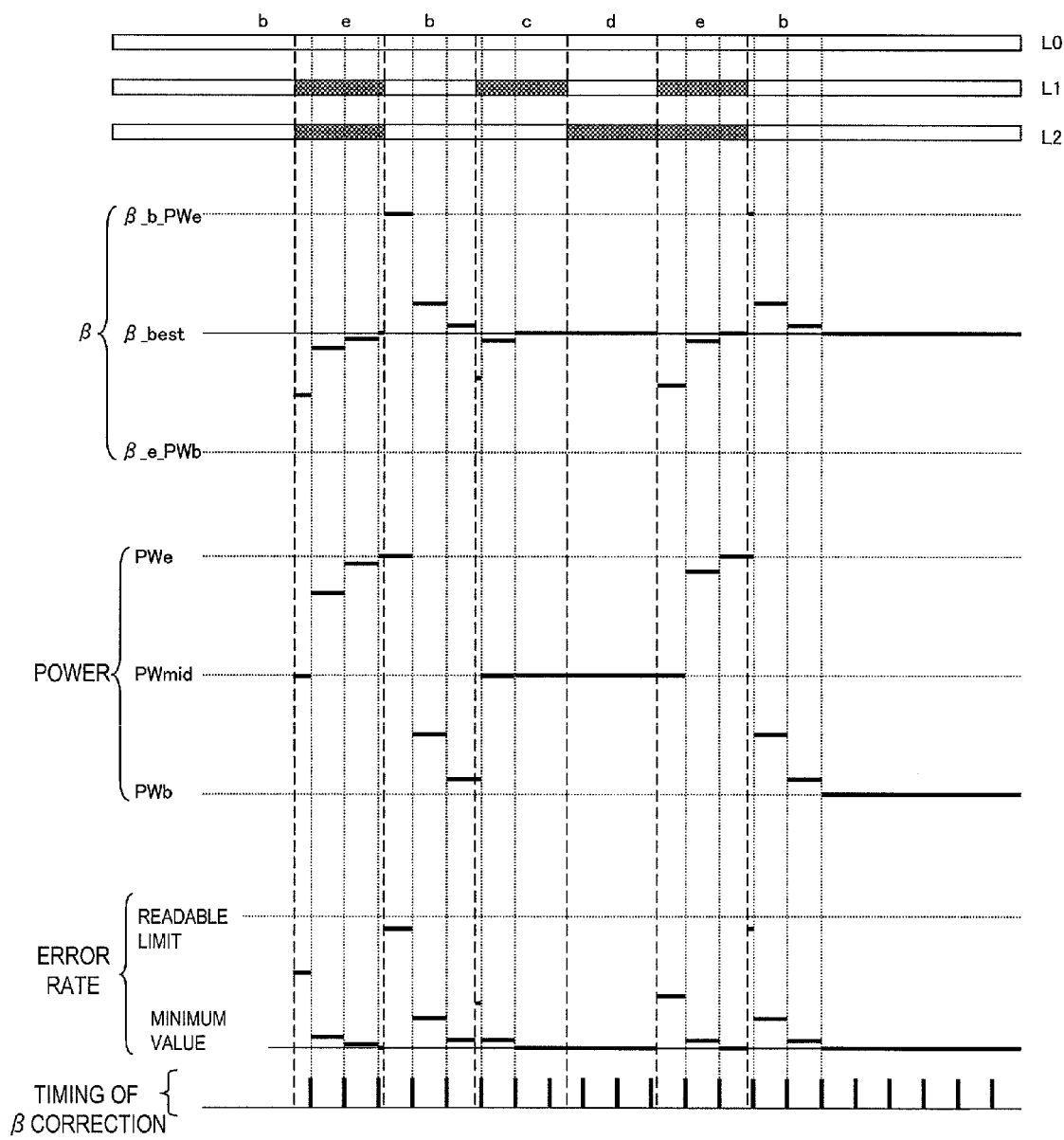
FIG. 19 shows how the β value, the optical recording power, and the error rate may change in a preferred embodiment of the present invention while data is being written on areas e, b, c, d, e and b.

In the example illustrated in FIG. 19, in an optical transmittance decreasing type optical disc, data needs be written on the areas e, b, c, d, e and b in this order. Specifically, in this example, the data starts to be written on the area e with the initial optical recording power PWmid. If the optical recording power is PWmid, the β value for the area e is smaller than β_best as shown in FIG. 18, for example. At the timings shown at the bottom of FIG. 19, β values are measured and the optical recording power is corrected based on the difference between the β value measured and the target β value (which will be referred to herein as a "β correction"). By performing the β correction for the first time, the optical recording power increases from PWmid to the vicinity of PWe. As a result, the error rate decreases and the β value comes closer to β_best. By making such a β correction, the optical recording power for the area e gets closer to the optimum value PWe for the area e. When the target areas of writing data are changed from the area e to the area b, the optical recording power that has come closer to the optimum value PWe for the area e has a value that is quite different from the optimum value PWb for the area b. That is why in the area b, the β value of the data that has been written with the optical recording power PWe increases to reach β_b_PWe that is greater than the target β value β_best. At this point in time, in the example illustrated in FIG. 19, the error rate is rather close to the readable limit. Nevertheless, since the β correction is carried out quickly, the optical recording power can soon get close to PWb, which is the optimum value for the area b.

By making such a β correction on the optical recording power, the optical recording power can be optimized quickly even if the target areas of writing data change in the order of the areas b, c, d, e and b.

Figure 20:
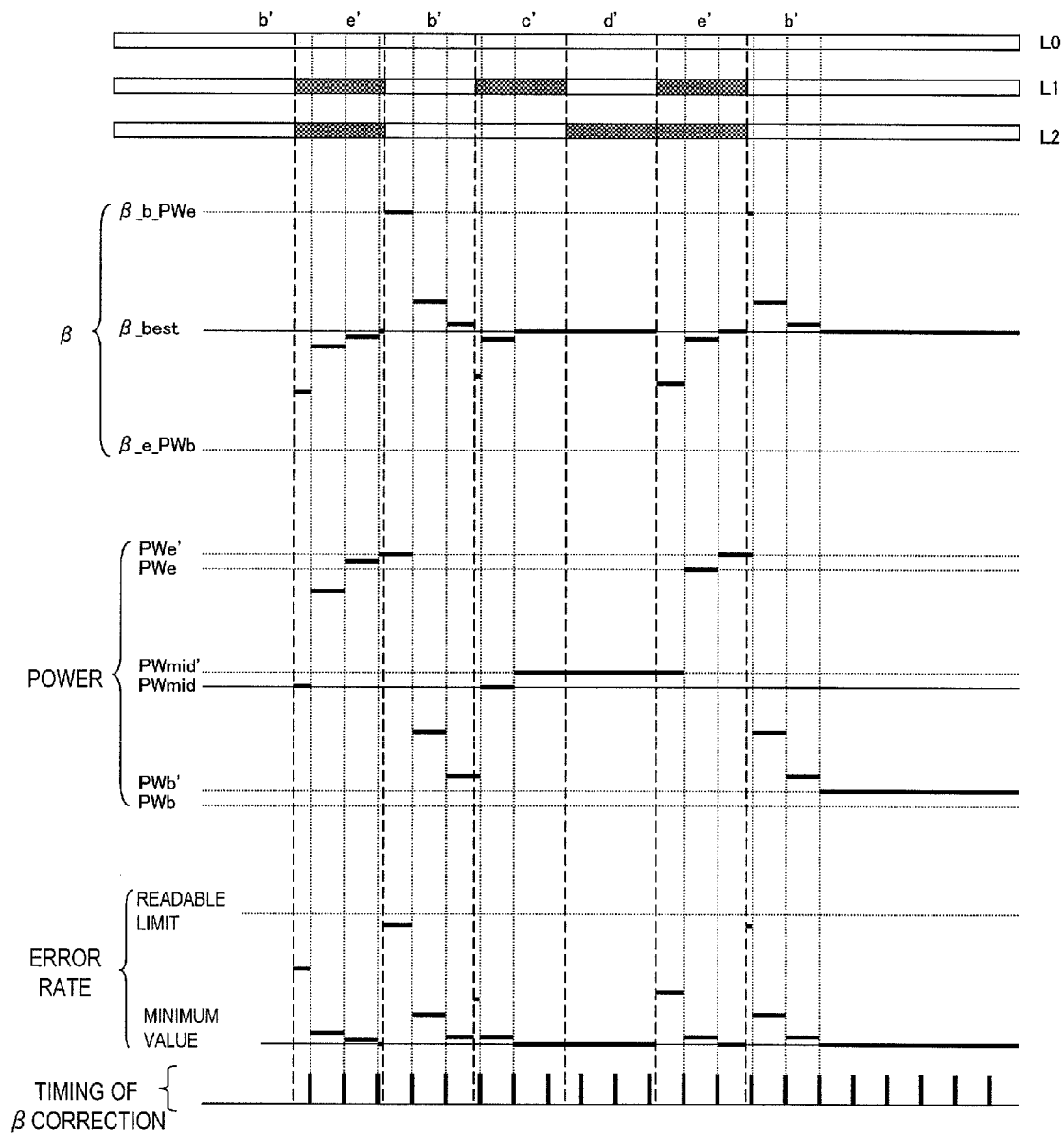
FIG. 20 shows how the β value, the optical recording power, and the error rate may change in a preferred embodiment of the present invention while data is being written on areas e', b', c', d', e' and b' that have lower sensitivities than the PCA.

Next, it will be described with reference to FIG. 20 how the β value, the optical recording power, and the error rate may change while data is being written on areas with low sensitivities. FIG. 20 is similar to FIG. 19. But in FIG. 20, the target areas of writing data change in the order of the areas e', b', c', d', e' and b'. For the purpose of comparison, not only the optimum values PWb' and PWe' of optical recording powers for the areas b' and e' but also the optimum value PWb and PWe of optical recording powers for the areas b and e are shown in FIG. 20.

According to this preferred embodiment, since the initial optical recording power is set to be PWmid (=PWb×correction coefficient), the error rate never exceeds the readable limit and the optical recording power can quickly get closer to its optimum value through the β correction, even if data starts to be written on an area e' with low sensitivity. Once the data has been written on the area e, basically the same operation is performed as what has already been described with reference to FIG. 19. In this case, however, the optical recording power determined by the β correction is controlled to a higher level than the one shown in FIG. 19. This is done in order to compensate for the lower sensitivity by the higher optical recording power.

If data started to be written on a recorded area with low sensitivity with the initial optical recording power set to be PWb as in the prior art, the error rate could exceed the readable limit. According to this preferred embodiment, however, those chances of exceeding the readable limit can be reduced significantly.

In the preferred embodiments described above, data is written on the information storage layer L0. When data is written on the information storage layer L1, however, an appropriate correction coefficient for that information storage layer may be retrieved from the memory and multiplied by the provisional initial optical recording power. In this manner, the initial optical recording power can also be calculated. It should be noted that when data is written on the shallowest information storage layer (e.g., the information storage layer L2 in a triple-layer optical disc), the correction coefficient may be set to be one.

Also, in the preferred embodiments described above, when data is written on the information storage layer L0 of an optical transmittance decreasing or increasing type multilayer optical disc that has N information storage layers (where N is an integer that is equal to or greater than two), data is tentatively written on the unrecorded area (where no data has been written yet) of the PCA of every information storage layer L1 through L(N−1), thereby determining the provisional initial optical recording power PWb. However, the provisional initial optical recording power PWe may also be determined by tentatively writing data on the recorded area (where data has already been written) of the PCA of every information storage layer L1 through L(N−1), and then multiplied by the correction coefficient (PWmin/PWe), thereby calculating the initial optical recording power PWmid. Optionally, the correction coefficient does not have to be an intermediate value between PWb and PWe but may also be an intermediate value between PWlow and PWhigh.

INDUSTRIAL APPLICABILITY

The present invention can be used extensively in any optical disc drive for writing computer data and/or audiovisual data on a multilayer optical disc such as a BD-R or a BD-RE.

REFERENCE SIGNS LIST

10 optical disc
11 optical head (optical pickup)
20 front end processor (FEP)
21 read processing section
22 decoder
30 laser driver
31 write processing section
32 encoder

The invention claimed is:

1. An optical disc drive for writing data on a multilayer optical disc that has N information storage layers (where N is an integer that is equal to or greater than two), the drive comprising:
an optical pickup for optically accessing the multilayer optical disc;
a memory that stores correction coefficient information with respect to each of the multiple information storage layers of each of multiple types of multilayer optical discs that are compatible with the optical disc drive, wherein the correction coefficient information provides a specific value of the correction coefficient for each said type of multilayer optical disc; and a write processing section for determining a provisional initial optical recording power by tentatively writing data on a test write area of one of the information storage layers of the multilayer optical disc loaded, choosing an appropriate correction coefficient from the memory according to a level of a target information storage layer, on which data is going to be written, and then correcting the provisional initial optical recording power based on the correction coefficient chosen, thereby determining an initial optical recording power, wherein the level of the target information storage layer is a position of the target information storage layer among the N information storage layers.

2. The optical disc drive of claim 1, wherein an appropriate correction coefficient is chosen according to the level of a target information storage layer, on which data is going to be written, and the provisional initial optical recording power is corrected based on the correction coefficient chosen, thereby determining an initial optical recording power, and wherein the data starts being written on the target information storage layer with the initial optical recording power.

3. The optical disc drive of claim 1, wherein if the number of layers is X (which is an integer that is equal to or greater than two) and if an $m^{th}$ information storage layer counted from the information storage layer that is located deepest (where m is an integer that satisfies $1 \leq m \leq X-1$) of the information storage layers of the multilayer optical disc is called an $m^{th}$ information storage layer, data is tentatively written on an unrecorded area of a test write area of the $m^{th}$ information storage layer, which needs to be subjected to the test write operation, thereby determining the provisional initial optical recording power, where the unrecorded area corresponds to a portion of each of the $(m+1)^{th}$ through $X^{th}$ information storage layers on which no data has been written yet.

4. The optical disc drive of claim 1, wherein the memory stores correction coefficient information with respect to each of the multiple information storage layers of each of multiple types of multilayer optical discs, wherein the correction coefficient information provides a specific value of the correction coefficient for each said type of multilayer optical disc, and wherein the type of each said multilayer optical disc is recognized by the structure and material of that optical disc, and wherein the appropriate correction coefficient is chosen from the memory according to not only the level of the target information storage layer but also the material of the optical disc loaded as well, and the initial optical recording power is determined by using the correction coefficient, no matter whether or not data has already been written on any other shallower information storage layer.

5. The optical disc drive of claim 4, wherein correction coefficient information is stored in the memory of the optical disc drive with respect to each of the multiple information storage layers of every type of multilayer optical disc that is compatible with the optical disc drive, wherein the correction coefficient information provides a specific value of the correction coefficient for each said type of multilayer optical disc.

6. The optical disc drive of claim 1, wherein if the multilayer optical disc loaded is an optical transmittance decreasing type, the initial optical recording power is greater than the provisional initial optical recording power.

7. The optical disc drive of claim 1, wherein if the multilayer optical disc loaded is an optical transmittance increasing type, the initial optical recording power is smaller than the provisional initial optical recording power.

8. The optical disc drive of claim 1, wherein the initial optical recording power is changed as needed based on the waveform of a signal that has been obtained from the optical disc after data has started to be written.

9. The optical disc drive of claim 1, wherein the optical recording power is corrected so that a $\beta$ value, indicating the degree of symmetry of the amplitude of a read signal obtained from the optical disc with respect to the average of the signal, becomes as close to a target $\beta$ value as possible after data has started to be written.

10. The optical disc drive of claim 3, wherein m=1.

11. The optical disc drive of claim 1, wherein the specific value of the correction coefficient for each said type of multilayer optical disc is such that the initial optical recording power is set at a value between a first optimum value PWb for the unrecorded area of the one of the information storage layers and a second optimum value PWe for a recorded area of the one of the information storage layers that is an area other than the unrecorded area of the one of the information storage layers.

* * * * *